US010924719B2

(12) United States Patent
Tomita et al.

(10) Patent No.: US 10,924,719 B2
(45) Date of Patent: Feb. 16, 2021

(54) HEAD MOUNTED TYPE VIDEO PRESENTING DEVICE INCLUDING VISIBLE LIGHT WAVELENGTH CONVERTING UNIT

(71) Applicant: JIG-SAW Inc., Sapporo (JP)

(72) Inventors: Hiroshi Tomita, Tokyo (JP); Eriko Sugano, Tokyo (JP); Tsuyoshi Fujii, Tokyo (JP)

(73) Assignee: JIG-SAW Inc.

( * ) Notice: Subject to any disclaimer, the term of this patent is extended or adjusted under 35 U.S.C. 154(b) by 0 days.

(21) Appl. No.: 16/471,394

(22) PCT Filed: Dec. 20, 2017

(86) PCT No.: PCT/JP2017/045766
§ 371 (c)(1),
(2) Date: Jun. 19, 2019

(87) PCT Pub. No.: WO2018/117163
PCT Pub. Date: Jun. 28, 2018

(65) Prior Publication Data
US 2019/0394439 A1    Dec. 26, 2019

(30) Foreign Application Priority Data

Dec. 22, 2016  (JP) .................... 2016-249858

(51) Int. Cl.
*H04N 9/67*    (2006.01)
*H04N 5/232*   (2006.01)
(Continued)

(52) U.S. Cl.
CPC ........... *H04N 9/67* (2013.01); *H04N 5/23229* (2013.01); *H04N 9/3182* (2013.01); *H04N 9/68* (2013.01);
(Continued)

(58) Field of Classification Search
CPC .. G09G 5/00; G09G 5/02; G09G 5/06; H04N 13/324; H04N 13/332; H04N 5/23229;
(Continued)

(56) References Cited

U.S. PATENT DOCUMENTS 8,470,790 B2    6/2013 Pan et al.
2009/0101820 A1*  4/2009 Nakata ................ H04N 5/2254
                                                        250/330

(Continued)

FOREIGN PATENT DOCUMENTS

JP    S63-282883 A    11/1988
JP    2003-223635 A    8/2003
(Continued)

OTHER PUBLICATIONS

International Search Report dated Mar. 13, 2018, issued in connection with International Patent Application No. PCT/JP2017/045766, 4 pages.
(Continued)

*Primary Examiner* — Amy R Hsu
(74) *Attorney, Agent, or Firm* — McDonnell Boehnen Hulbert & Berghoff LLP

(57) ABSTRACT

Provided is a head-mounted video presentation device which has a visible light wavelength conversion and is designed for a user having degraded sensitivity to a first wavelength band as a part of a visible light wavelength band as compared with a second wavelength band as the remaining part of the visible light wavelength band. A head-mounted video presentation device for a user having degraded sensitivity to a first wavelength band as a part of a visible light wavelength band as compared with a second wavelength band as the remaining part of the visible light wavelength band includes: an imaging unit for taking a video in a viewing direction of the user to acquire first video information; a wavelength
(Continued)

conversion unit for converting at least a part of a color signal for at least the first wavelength band in the first video information into a color signal expressing colors in the second wavelength band, and outputting second video information based on the converted color signal; and a video presentation unit for presenting, based on the second video information, a wavelength-converted video in the viewing direction of the user, to the user.

18 Claims, 13 Drawing Sheets

(51) Int. Cl.
    *H04N 9/31*         (2006.01)
    *H04N 9/68*         (2006.01)
    *H04N 13/332*     (2018.01)
    *H04N 13/324*     (2018.01)

(52) U.S. Cl.
    CPC ......... *H04N 13/324* (2018.05); *H04N 13/332* (2018.05)

(58) Field of Classification Search
    CPC .. H04N 5/64; H04N 7/18; H04N 9/31; H04N 9/3182; H04N 9/64; H04N 9/67; H04N 9/68
    See application file for complete search history.

(56) References Cited

U.S. PATENT DOCUMENTS

| | | | | |
|---|---|---|---|---|
| 2010/0309315 | A1* | 12/2010 | Hogasten | H04N 5/332 348/164 |
| 2011/0043644 | A1* | 2/2011 | Munger | H04N 13/344 348/207.1 |
| 2012/0169756 | A1* | 7/2012 | Ohtsuka | G09G 5/02 345/589 |
| 2012/0190629 | A1 | 7/2012 | Tomita et al. | |
| 2014/0152840 | A1* | 6/2014 | McCloskey | G01S 17/74 348/164 |
| 2015/0002808 | A1* | 1/2015 | Rizzo, III | G02C 11/10 351/158 |
| 2016/0269646 | A1* | 9/2016 | Grata | H04N 5/2354 |
| 2017/0301310 | A1* | 10/2017 | Bonnier | G09G 5/06 |
| 2018/0012377 | A1* | 1/2018 | Dayal | G06K 9/00369 |
| 2018/0129050 | A1* | 5/2018 | Hayashi | H04N 9/097 |

FOREIGN PATENT DOCUMENTS

| | | |
|---|---|---|
| JP | 2014-165768 A | 9/2014 |
| JP | 2016-095577 A | 5/2016 |
| WO | 2011/019081 A1 | 2/2011 |
| WO | 2016/036860 A1 | 3/2016 |

OTHER PUBLICATIONS

Written Opinion dated Mar. 13, 2018, issued in connection with International Patent Application No. PCT/JP2017/045766, 6 pages.

Zemelman et al., "Selective Photostimulation of Genetically Charged Neurons", Neuron, 2002, 33(1), 15-22.

Nagel et al., "Channelrhodopsin-2, a directly light-gated cation-selective membrane channel", Proc. Natl. Acad. Sci., 2003, 100(24), 13940-5.

Zhang et al., "Red-shifted optogenetic excitation: a tool for fast neural control derived from Volvox carteri", Nature Neuroscience, 2008, 11(6), 8 pages.

Ohkubo et al., "Development of a Time-sharing-based Color-assisted Vision System for Persons with Color-vision Deficiency", SICE Annual Conference 2010, Proceedings of IEEE, 2010, 2499-2503, XP031775783.

Extended European Search Report issued in connection with European Patent Application No. 17885321.4, dated Jun. 8, 2020, 8 pages.

* cited by examiner

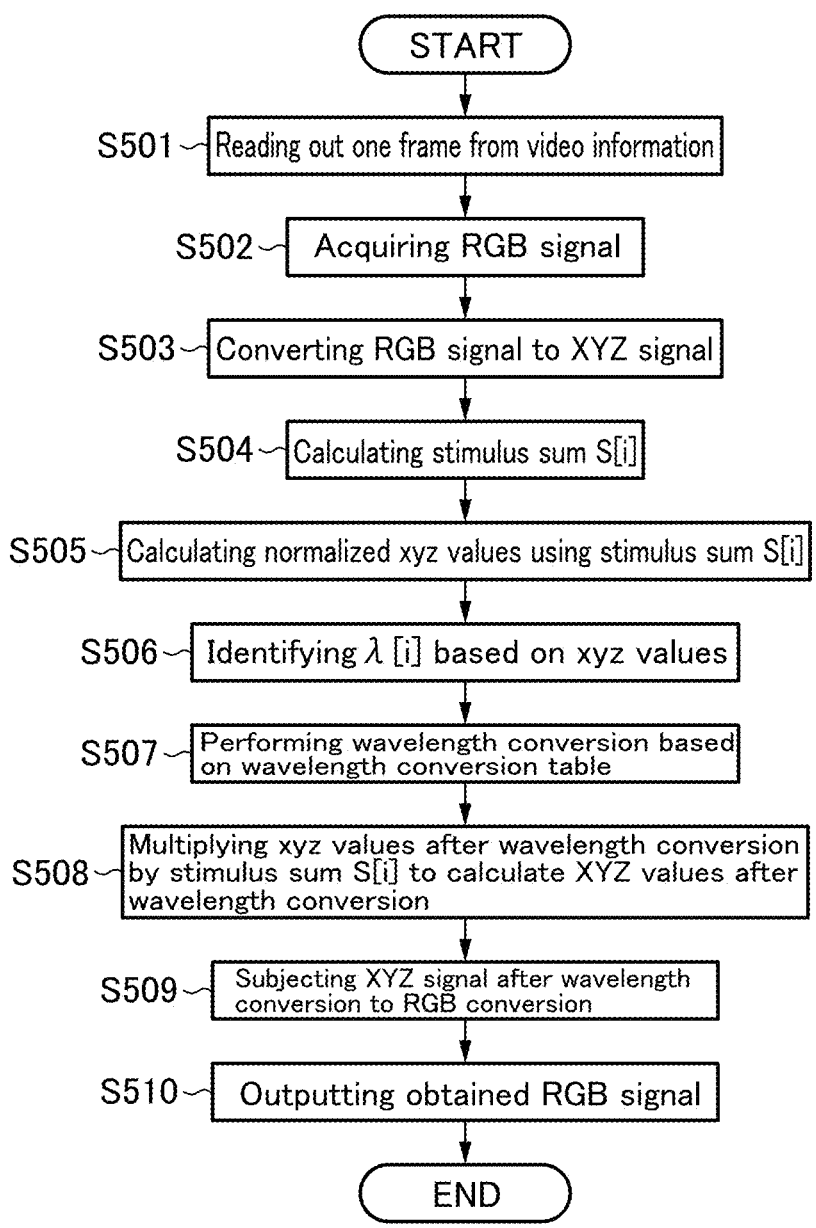

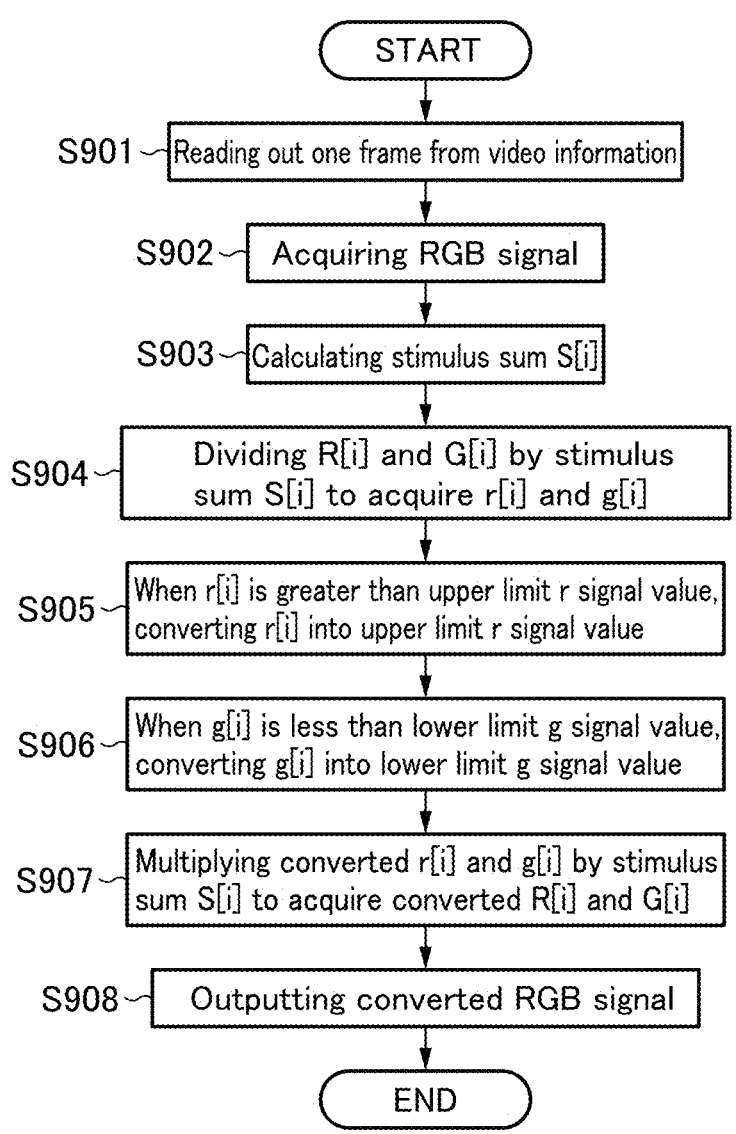

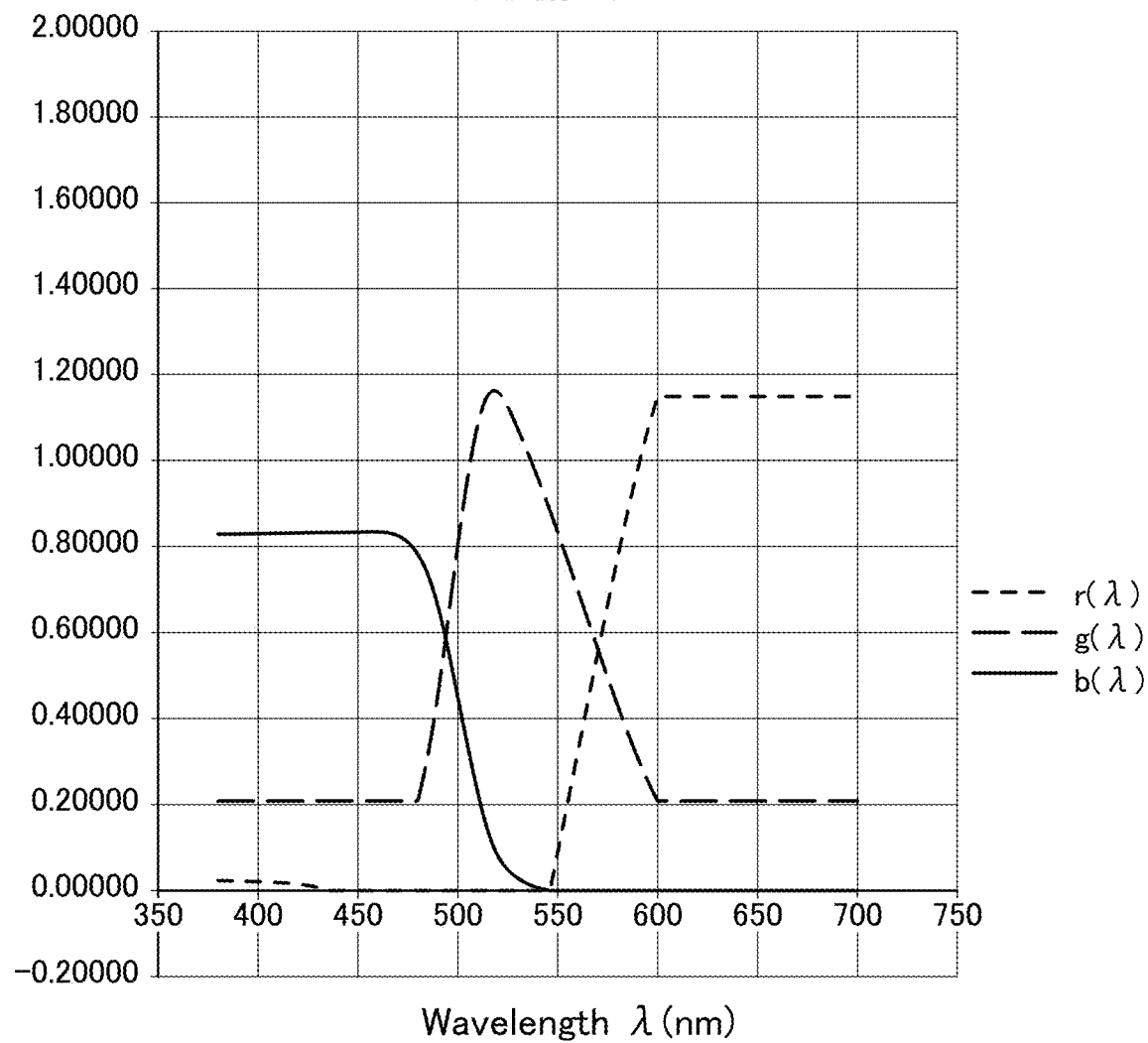

HEAD MOUNTED TYPE VIDEO PRESENTING DEVICE INCLUDING VISIBLE LIGHT WAVELENGTH CONVERTING UNIT

This application is a U.S. National Phase Application under 35 U.S.C. § 371 of International Application No. PCT/JP2017/045766, filed Dec. 20, 2017, which claims priority to Japanese Patent Application No. 2016-249858, filed Dec. 22, 2016, the contents of which are incorporated herein by reference in their entirety.

TECHNICAL FIELD

The present invention relates to a head-mounted video presentation device having a visible light wavelength conversion unit.

BACKGROUND ART

The annual number of persons who lose their sight in Japan reaches about 16,000, and the causes thereof, excluding severe injury, can be broadly classified into two categories: the disorder of the inner layer of the retina and the disorder of the outer layer of the retina. In retinal degenerative diseases such as retinal pigmentary degeneration, age-related macular degeneration and retinal detachment, it is known that the outer layer of the retina selectively degenerates. Here, looking at photoreception of the retina and signaling mechanisms therein, incident light or video information is received and transmitted to the inner layer of the retina by photoreceptor (photosensitive) cells (visual cells) located in the outer layer of the retina. Then, the information is transmitted to the brain by ganglion cells located in the inner layer of the retina to form the optic nerve. As above, in the retina, cells capable of receiving light or video are only the visual cells. Thus, degeneration or disappearance of the visual cells due to some cause will lead to sight loss, even when other cells are normal.

As viewed from the photoreception system of the visual cells, it has been found that, after photoreception by a photoreceptor protein existing in the visual cells, a chain reaction of various other proteins is required. In view of such a system, it has heretofore been considered that the introduction of only a single type of gene does not enable the impartment of photoreceptivity. In this regard, it has been reported that the impartment of photoreceptivity to the nerve cells requires the introduction of at least three types of proteins (i.e., arrestin, opsin, and G protein α subunit) into each cell (the following Non-Patent Document 1).

Nagel et al., (the following Non-Patent Document 2) have reported that channelrhodopsin-2 (hereinafter also referred to as "ChR2") isolated from green alga *Chlamydomonas* has both photoreceptivity and cation-selective permeability, and the introduction of ChR2 gene enables the impartment of photoreceptivity to cultured mammalian cells (HEK293 cells, BHK cells) and the like. Further, a similar gene having sensitivity to red has been found from green alga *Volvox carteri* (the following Non-Patent Document 3).

The present inventors found that a modified *Volvox carteri*-derived photoreceptor (light-receiving) channel rhodopsin protein obtained by fusing an N-terminal region of *Chlamydomonas reinhardtii*-derived channel rhodopsin-1 to *Volvox carteri*-derived photoreceptor channel rhodopsin protein can be used to improve the expression efficiency of the channel rhodopsin on the cell membrane (the following Patent Document 1).

CITATION LIST

Parent Document

Patent Document 1: WO 2011/019081

Non-Patent Document

Non-Patent Document 1: Zemelman B V et al., Neuron. 2002 Jap 3; 33(1): 15-22
Non-Patent Document 2: Nagel G et al., Proc Natl Acad Sci USA. 2003 Nov. 25; 100(24): 13940-5
Non-Patent Document 3: Freng Zhang et al., Nature Neuroscience, Volume 11, Number 6, June 2008; p 631-633

SUMMARY OF INVENTION

Technical Problem

However, the *Chlamydomonas*-derived ChR2 has photosensitivity which is limited to blue, so that, even if it enables a person to recover visual ability, the person can visually perceive only blue. Further, although the similar photosensitive gene found from green alga *Volvox carteri* also enables the recovery of visual ability, a visually perceivable color is limited to red. Although the modified *Volvox carteri*-derived photoreceptor channel rhodopsin protein is capable of responding to a wider wavelength band, such a wavelength band is limited to a range of around 450 to 600 nm, but good response is not exhibited in a wavelength band of 380 to 450 nm and a wavelength band of 600 to 750 nm.

As above, although administration of a protein to a patient with retinal degeneration allows the patient to respond to a certain part of a visible light wavelength band, but still fails to allow the patient to respond to the remaining visible light wavelength band. A means to allow a person, including a patient with retinal degeneration, whose sensitivity to a part of a visible light wavelength band is degraded, to entirely recognize visible light entering the field of view of the person has not been realized.

Solution to Technical Problem

The present invention has been made in view of the above problem, and has the following features. According to a first aspect of the present invention, there is provided a head-mounted video presentation device for a user having degraded sensitivity to a first wavelength band as a part of a visible light wavelength band as compared with a second wavelength band as the remaining part of the visible light wavelength band. The head-mounted video presentation device comprises: an imaging unit for taking a video in a viewing direction of the user to acquire first video information; a wavelength conversion unit for converting at least a part of a color signal for at least the first wavelength band in the first video information, into a color signal expressing colors in the second wavelength band, and outputting second video information based on the converted color signal; and a video presentation unit for presenting, based on the second video information, a wavelength-converted video in the viewing direction of the user, to the user.

Preferably, in the head-mounted video presentation device of the present invention, the wavelength conversion unit has: a first table including spectral chromaticity coordinates in an XYZ color system; and a second table for converting wavelengths in the first wavelength band into wavelengths in the second wavelength band, wherein a part of plural sets of chromaticity coordinates each associated in the first table with a respective one of the wavelengths in the first wavelength band are associated, respectively, with a part of the wavelengths in the second wavelength band, and at least a part of the remaining sets of chromaticity coordinates each associated in the first table with a respective one of the wavelengths in the second wavelength band are associated, respectively, with plural sets of chromaticity coordinates different from the sets of chromaticity coordinates each associated in the first table with a respective one of the wavelengths in the second wavelength band, wherein the wavelength conversion unit is operable to: acquire, based on the first video information, an XYZ signal expressing colors by the XYZ color system; identify, based on the first table, a wavelength corresponding to the XYZ signal; acquire, based on the second table, an XYZ signal for a post-conversion wavelength associated with the identified wavelength; and output second video information based on the XYZ signal for the post-conversion wavelength.

Preferably, in the head-mounted video presentation device of the present invention, the wavelength conversion unit is operable to: acquire, based on the first video information, an RGB signal expressing colors by an RGB color system; calculate a stimulus sum of an XYZ signal, based on the RGB signal; divide a value of an R signal acquired from the RGB signal by the stimulus sum to acquire a value of an r signal; when the acquired value of the r signal is greater than an upper limit of the r signal, convert the acquired value of the r signal into the upper limit of the r signal; multiply the converted value of the r signal by the stimulus sum to acquire a converted value of the R signal; and output second video information based on an RGB signal including the converted value of the R signal, wherein the upper limit of the r signal is equal to or less than a maximum value of the r signal in the second wavelength band to be obtained by subjecting the spectral chromaticity coordinates in the XYZ color system to RGB conversion.

More preferably, in the above head-mounted video presentation device, the wavelength conversion unit is operable to: divide a value of a G signal acquired from the RGB signal by the stimulus sum to acquire a value of a g signal; when the acquired value of the g signal is less than a lower limit of the g signal, convert the acquired value of the g signal into the lower limit of the g signal; multiply the converted value of the g signal by the stimulus sum to acquire a converted value of the G signal; and output second video information based on an RGB signal further including the converted value of the G signal, wherein the lower limit of the g signal is equal to or greater than a greater one of values of the g signal for wavelengths at both edges of the second wavelength band to be obtained by subjecting the spectral chromaticity coordinates in the XYZ color system to RGB conversion.

Preferably, in the head-mounted video presentation device of the present invention, the wavelength conversion unit is operable to: acquire, based on the first video information, an RGB signal expressing colors by an RGB color system; multiply a value of an R signal included in the acquired RGB signal by an r signal conversion coefficient determined based on spectral chromaticity coordinates in an RGB color system to be obtained by subjecting the spectral chromaticity coordinates in the XYZ color system to RGB conversion, to acquire a converted value of the R signal; output second video information based on an RGB signal including the converted value of the R signal, wherein the r signal conversion coefficient is determined such that a maximum one of values obtained when multiplying values of an r signal in the spectral chromaticity coordinates in the RGB color system by the r signal conversion coefficient does not exceed an upper limit of the r signal, and wherein the upper limit of the r signal is equal to or less than a maximum value of the r signal in the second wavelength band in the spectral chromaticity coordinates in the RGB color system.

More preferably, in the above head-mounted video presentation device, the wavelength conversion unit is operable to, instead of multiplying a value of the R signal included in the acquired RGB signal by the r signal conversion coefficient to acquire a converted value of the R signal, to: divide a value of an R signal included in the acquired RGB signal by a stimulus sum calculated based on the acquired RGB signal, to obtain a value of an r signal; multiply the obtained value of the r signal by the r signal conversion coefficient to acquire a converted value of the r signal; and multiply the converted value of the r signal by the stimulus sum, to acquire a converted value of the R signal.

Preferably, in the head-mounted video presentation device of the present invention, the wavelength conversion unit is operable to: calculate a stimulus sum of an XYZ signal, based on the acquired RGB signal; divide a value of a G signal included in the acquired RGB signal by the stimulus sum to acquire a value of a g signal; after multiplying the acquired value of the g signal by a given coefficient, add a lower limit of the g signal to the resulting product, and multiply the resulting sum by the stimulus sum to acquire a converted value of the G signal; and output second video information based on an RGB signal further including the converted value of the G signal, wherein the lower limit of the g signal is equal to or greater than a greater one of values of the g signal for wavelengths at both edges of the second wavelength band in the spectral chromaticity coordinates in the RGB color system.

In the head-mounted video presentation device of the present invention, the upper limit of the r signal may be a value of the r signal for a wavelength of 600 nm.

In the head-mounted video presentation device of the present invention, the second wavelength band may be in the range of 450 to 600 nm In the head-mounted video presentation device of the present invention, the video presentation unit may be a projector or a display.

Preferably, in the head-mounted video presentation device of the present invention, the imaging unit is operable to take a left eye video in the viewing direction of the user to be presented to a left eye of the user, and a right eye video in the viewing direction of the user to be presented to a right eye of the user, wherein the right eye video is different from the left eye video, and wherein the first video information includes video information for the left eye video and the right eye video, and the second video information includes video information for a converted left eye video and a converted right eye video obtained by converting the left eye video and the right eye video through the wavelength conversion unit, and wherein the video presentation unit is operable, based on the video information for the converted left eye video included in the second video information, to present the converted left eye video to the left eye of the user, and, based on the video information for the converted right eye video included in the second video information, to present the converted right eye video to the right eye of the user.

In the head-mounted video presentation device of the present invention, the user may be a patient with a retinal degenerative disease, whose eyeball is administrated with a protein for enabling ganglion cells to become receptive to light in the second wavelength band.

According to a second aspect of the present invention, there is provided a wavelength conversion unit for outputting, to a user having degraded sensitivity to a first wavelength band as a part of a visible light wavelength band as compared with a second wavelength band as the remaining part of the visible light wavelength band, a video signal for presenting a video based on a color signal expressing colors in the second wavelength band. The wavelength conversion unit is operable to convert at least a part of a color signal for at least the first wavelength band in first video information acquired by taking a video in a viewing direction of the user, into the color signal expressing colors in the second wavelength band, and outputting second video information based on the converted color signal.

According to a third aspect of the present invention, there is provided a program for outputting, to a user having degraded sensitivity to a first wavelength band as a part of a visible light wavelength band as compared with a second wavelength band as the remaining part of the visible light wavelength band, a video signal for presenting a video based on a color signal expressing colors in the second wavelength band. The program is configured to cause a computer to execute the steps of: converting at least a part of a color signal for at least the first wavelength band in first video information acquired by taking a video in a viewing direction of the user, into the color signal expressing colors in the second wavelength band; and outputting second video information based on the converted color signal.

According to a fourth aspect of the present invention, there is provided a method for outputting, to a user having degraded sensitivity to a first wavelength band as a part of a visible light wavelength band as compared with a second wavelength band as the remaining part of the visible light wavelength band, a video signal for presenting a video based on a color signal expressing colors in the second wavelength band. The method comprises causing a computer to execute the steps of: converting at least a part of a color signal for at least the first wavelength band in first video information acquired by taking a video in a viewing direction of the user, into the color signal expressing colors in the second wavelength band; and outputting second video information based on the converted color signal.

Effect of Invention

The present invention makes it possible to allow even a person having degraded sensitivity to a part of a visible light wavelength band as compared with the remaining visible light wavelength band, to entirely recognize visible light.

BRIEF DESCRIPTION OF DRAWINGS

FIG. 5 is a flowchart showing information processing in a head-mounted video presentation device according to a second embodiment of the present invention.

FIG. 9 is a flowchart showing information processing in a head-mounted video presentation device according to a fourth embodiment of the present invention.

FIG. 10 is a graph representing spectral chromaticity coordinates in the RGB color system to be used in the head-mounted video presentation device according to the fourth embodiment.

DESCRIPTION OF EMBODIMENTS

First Embodiment

With reference to FIGS. 1A to 1D, a head-mounted video presentation device 100 according to a first embodiment of the present invention will be described. The head-mounted video presentation device 100 is a device to be used while being mounted to the head of a user, and comprises an imaging unit 101 and a video presentation unit 102. The imaging unit 101 is disposed at a position capable of taking a video in a viewing direction of the user, and the video presentation unit 102 is disposed at a position capable of presenting a video to the user. The head-mounted video presentation device 100 is operable to subject the video taken in the viewing direction of the user by the imaging unit 101 to wavelength conversion (color conversion) through a wavelength conversion unit 103, and present the wavelength-converted video to the user through the video presentation unit 102. In FIG. 1, depiction of the wavelength conversion unit 103 is omitted.

Figure 1A:
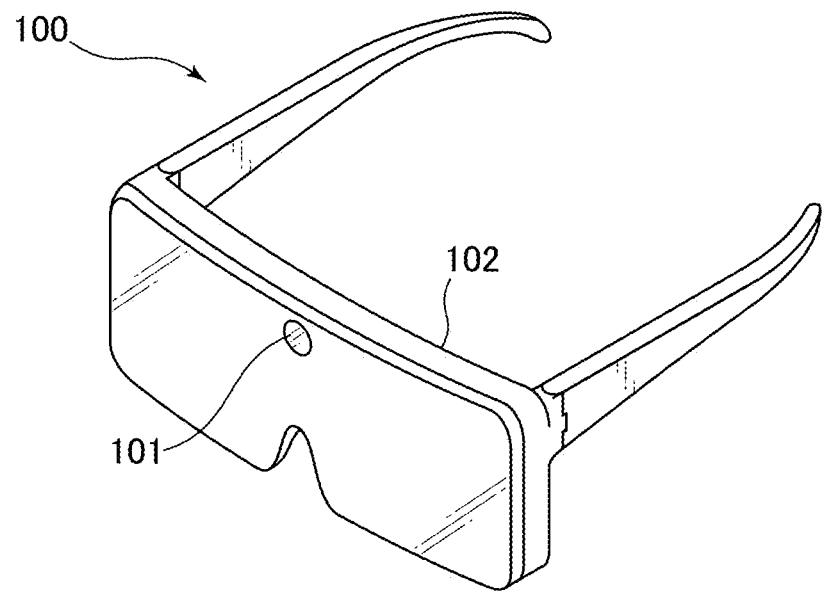
FIG. 1A is a schematic perspective front view of a head-mounted video presentation device according to a first embodiment of the present invention.
Figure 1B:
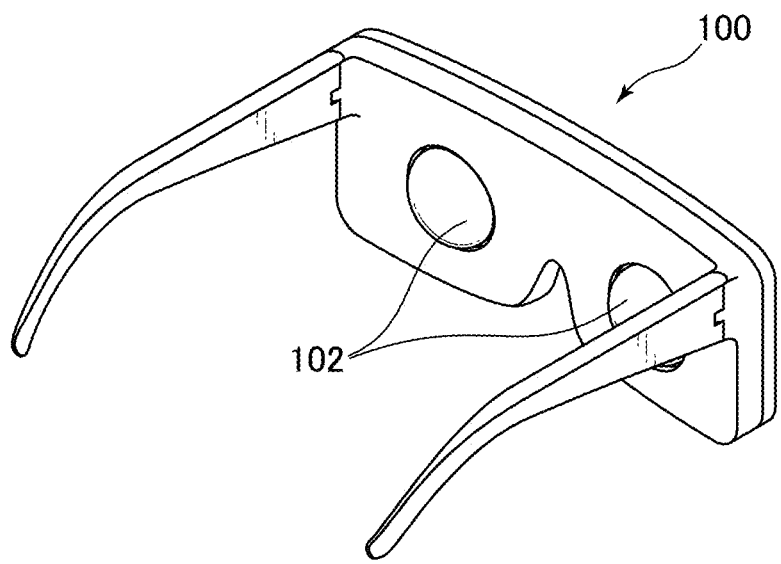
FIG. 1B is a schematic perspective back view of the head-mounted video presentation device according to the first embodiment.
Figure 1C:
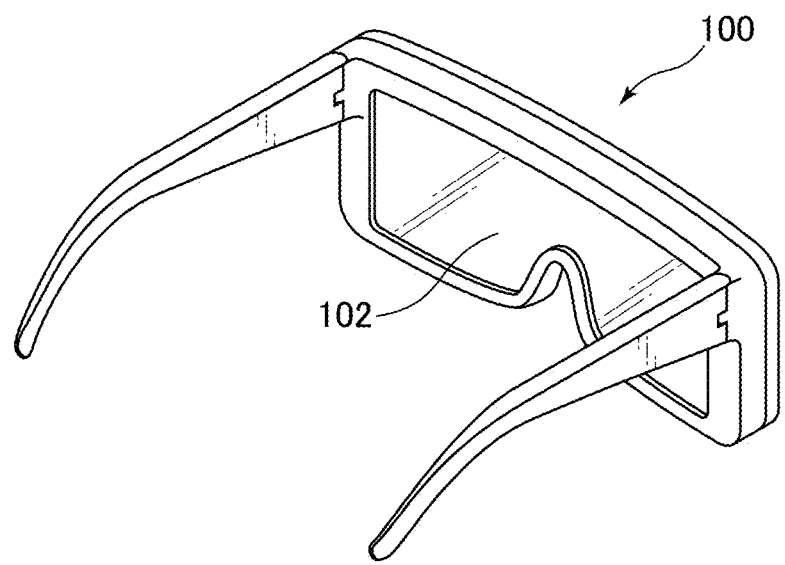
FIG. 1C is a schematic perspective back view of the head-mounted video presentation device according to the first embodiment.
Figure 1D:
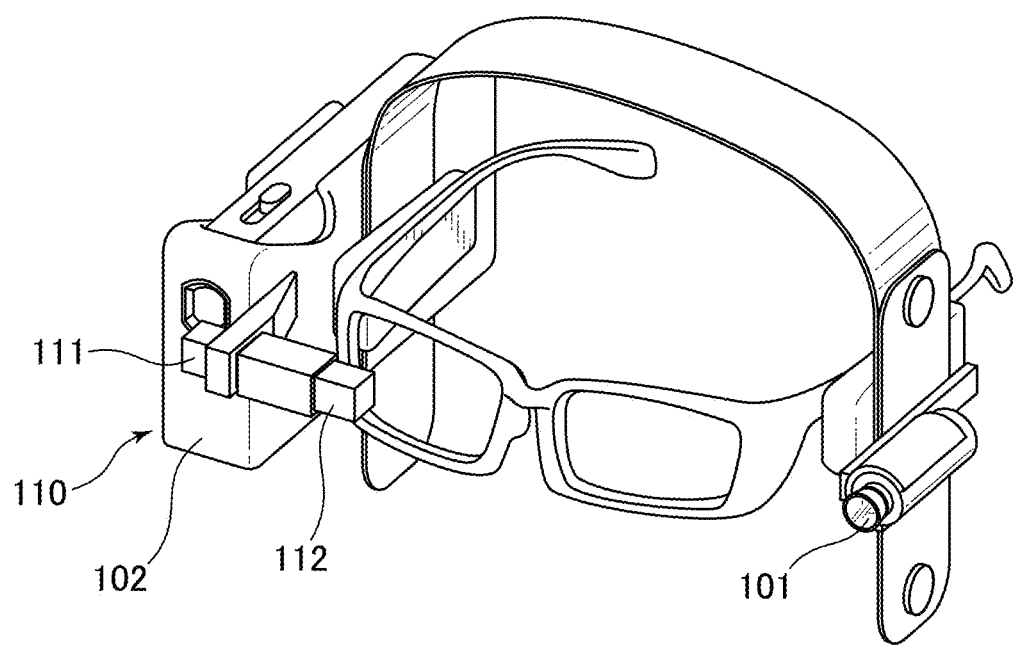
FIG. 1D is a schematic perspective back view of another configuration example of the head-mounted video presentation device according to the first embodiment.

FIG. 1A is a schematic perspective front view of a first configuration example of the head-mounted video presentation device 100, and FIGS. 1B and 1C are schematic perspective back views thereof. FIG. 1D is a schematic perspective back view of a second configuration example of the head-mounted video presentation device 100. Specifically, in the first configuration example depicted in FIG. 1B, a projector lens is used as the video presentation unit 102. More specifically, the head-mounted video presentation device in FIG. 2B is configured such that two projector lenses are provided, respectively, for right and left eyes. Alternatively, with a view to reductions in weight and cost, it may be configured such that only one projector lens is provided to present the video to only one of the eyes. In the first configuration example depicted in FIG. 1C, a display is used as the video presentation unit 102. On the other hand, in the second configuration example depicted in FIG. 1D, a projector is used as the video presentation unit 102, wherein the projector comprises a projector housing 110, and prisms 111, 112. Light radiated from the projector housing 110 is refracted by 180 degrees through the prisms 111, 112, and radiated toward the right eye of the user. The projector may be configured to directly project the video to the retina of the user by using, e.g., a retinal projection system, to thereby allow the user to visually perceive the video.

Figure 2:
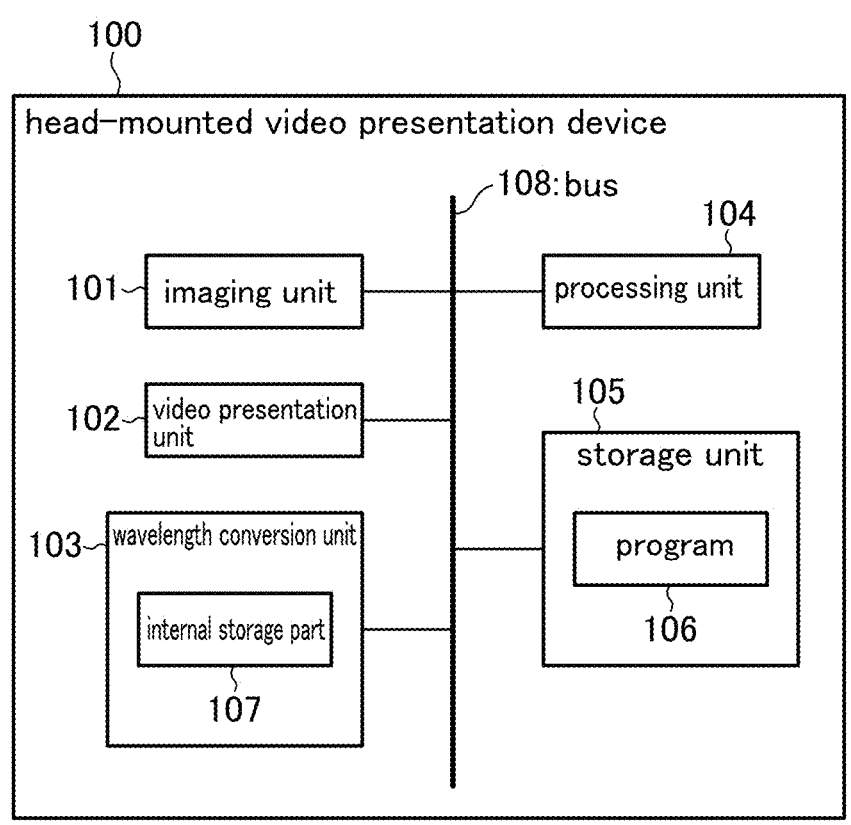
FIG. 2 is a block diagram depicting a hardware configuration of the head-mounted video presentation device according to the first embodiment.

FIG. 2 is a diagram depicting a hardware configuration of the head-mounted video presentation device 100 according to the first embodiment. The head-mounted video presentation device 100 comprises the imaging unit 101, the video presentation unit 102 and the wavelength conversion unit 103, as described above, and further comprises a processing unit 104, a storage unit 105, and a bus 108. The wavelength conversion unit 103 comprises an internal storage part 107. The storage unit 105 stores therein a program 106.

The head-mounted video presentation device 100 is designed for a user having degraded sensitivity to a first wavelength band as a part of a visible light wavelength band as compared with a second wavelength band as the remaining part of the visible light wavelength band. Due to the degraded sensitivity to the first wavelength band, the user is hard to or completely unable to recognize light in the first wavelength band. As used in this specification, the term "degraded sensitivity" includes no sensitivity. On the other hand, the user has higher sensitivity to the second wavelength band as compared with the first wavelength band, although the sensitivity is likely to be lower than that of a healthy person. The head-mounted video presentation device 100 is operable to subject light in a wavelength band to which the user has relatively low sensitivity to wavelength conversion so as to allow the user to recognize a video in a wavelength band to which the user has relatively high sensitivity.

A reason for the degradation in sensitivity of a user as a target of the present invention to a visible light wavelength is not particularly limited. Examples of the reason include retinal degenerative diseases such as retinal pigmentary degeneration, age-related macular degeneration, and retinal detachment. Here, assume that a target user in the first embodiment is a patient with retinal degeneration, wherein, with regard to a color in a wavelength band of 450 to 600 nm in a visible light wavelength band, the sensitivity is improved by administration of a modified *Volvox carteri*-derived photoreceptor channel rhodopsin protein and become capable of recognizing the light, whereas, with regard to colors in a wavelength band of 380 to 450 nm and a wavelength band of 600 to 750 nm in the visible light wavelength band, the sensitivity is still significantly low and incapable of recognizing the lights.

The imaging unit 101 is operable to take a video in the viewing direction of the user to acquire first video information. Then, the wavelength conversion unit 103 is operable to convert at least a part of a color signal for of at least the first wavelength band to which the user has degraded sensitivity, in the first video information acquired by the imaging unit 101, to a color signal expressing colors in the second wavelength band to which the user has relatively high sensitivity, in the visible wavelength band, and output second video information based on the converted color signal. Then, the video presentation unit 102 is operable, based on the second video information output from the wavelength conversion unit 103, to present the wavelength-converted video in the viewing direction of the user, to the user. The video presentation unit 102 may be a projector for presenting a video, or may be a display for presenting a video, such as a liquid crystal display, an organic EL display, or a plasma display.

Some users cannot sufficiently recognize visible light under a light intensity radiated from a video presentation unit such as a display, even in a wavelength band (the second wavelength band) of visible light to which the user had relatively good sensitivity. For such a user, it is desirable to use a projector as the video presentation unit 102. The projector is capable of allowing high-intensity visible to directly enter the user's eye(s), so that the user can recognize the video. In the first embodiment, when a projector comprising two projector lenses is used as the video presentation unit 102, light is radiated through the two lenses to present two same videos based on the second video information. Further, when using the projector comprising two projector lenses, it is preferable to present two videos subjected to different wavelength conversions, respectively, to the eyes. In this case, in a situation where the eyes have different sensitivities to each wavelength, the wavelength conversion can be performed in a suitable manner with respect to each of the eyes.

The processing unit 104 is operable to control the imaging unit 101, the video presentation unit 102 and the wavelength conversion unit 103, based on instructions included in the program 106 stored in the storage unit 105, to execute information processing. The storage unit 105 includes a hard disk, a main memory, and a buffer memory. The storage unit 105 stores therein the program 106. As long as the storage unit 105 is capable of storing therein information, it may be a non-volatile storage or a non-volatile memory, or may be a detachable unit. In addition to the program 106, the storage unit 105 stores therein a variety of data to be referred to along with the execution of the program 106. As a means to store information necessary for the wavelength conversion, the wavelength conversion unit 103 may be configured to use the internal storage part 107, or may be configured to use the storage unit 105, or may be configured to use the internal storage part 107 and the storage unit 105 in combination. As with the storage unit 105, the internal storage part 107 includes a hard disk, a main memory, and a buffer memory. The wavelength conversion unit 103 may be realized by an integrated circuit, or a function as the wavelength conversion unit may be realized by allowing the processing unit 104 to execute the program 106 stored in the storage unit 105. The bus 108 connects among hardware elements comprised in the head-mounted video presentation device 100.

Figure 3:
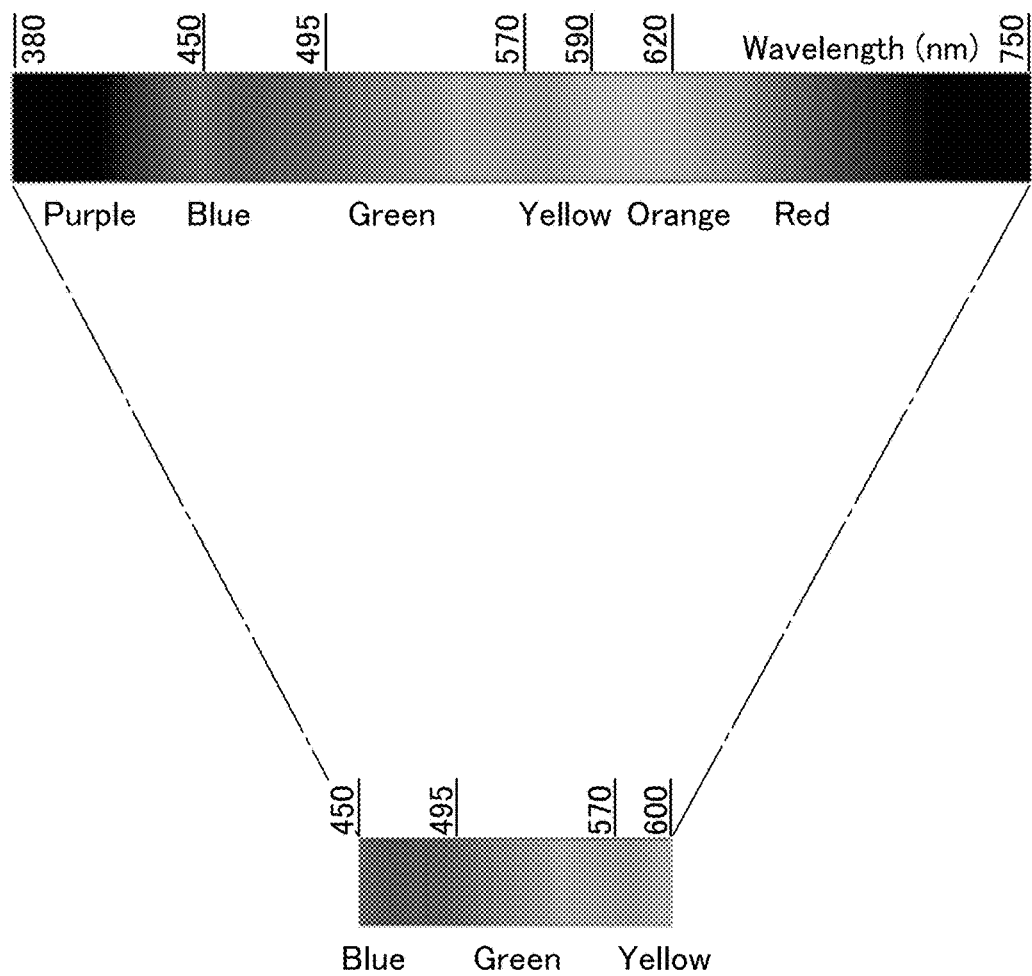
FIG. 3 is a diagram showing a wavelength band before and after conversion in the head-mounted video presentation device according to the first embodiment.

In this embodiment, light in a visible light wavelength band of 380 to 750 nm is converted into light in a wavelength band of 450 to 600 nm, as depicted in FIG. 3. That is, visible light in a wavelength band of 380 to 750 nm is converted into light of wavelengths ranging from 450 to 600 nm which is recognizable by a user as a target of this embodiment, and the converted light is presented to the user without outputting or presenting a wavelength band of less than 450 nm and a wavelength band of greater than 600 nm. Thus, even in a situation where visible light having intrinsically unrecognizable wavelengths is included in the field of view of the user, it is possible to allow the user to recognize a video of the field of view including the presence of the visible light, although the visible light is converted into wavelengths different from the actual wavelengths.

The operation of the head-mounted video presentation device 100 according to this embodiment will be described based on the flowchart depicted in FIG. 4. First of all, in step 401, the imaging unit 101 starts to take a video in the viewing direction of the user to acquire first video information. The imaging unit 101 continues the imaging and continuously outputs the first video information to the wavelength conversion unit 103, unless it is deactivated. In step 402, upon acquisition of the first video information output from the imaging unit 101, the wavelength conversion unit 103 converts at least a part of a color signal for light of wavelengths equal to or less than 380 nm and equal to greater than 750 nm into a color signal expressing colors of light of wavelengths ranging from 450 to 600 nm, and outputs second video information based on the converted color signal. The wavelength conversion may be performed with respect to the entire visible light wavelength band, or may be performed with respect to any wavelength band as long as it includes a wavelength band of less than 450 nm and a wavelength band of greater than 600 nm which are unrecognizable by the user. In step 403, the video presentation unit 102 presents a wavelength-converted video in the viewing direction of the user, based on the second video information output from the wavelength conversion unit 103. For example, in the case where the video presentation unit 102 is a projector, the presentation of the video is performed by radiating light generated based on the video information, from the projector. Subsequently, the routine returns to the step 402 to repeat processing in which, in the step 402, the wavelength conversion unit 103 subjects the first video information sequentially output from the imaging unit 101 to the wavelength conversion and outputs the second video information, and then, in the step 403, the video presentation unit 102 presents a video based on the second video information.

In the head-mounted video presentation device 100 according to the first embodiment, the processing is executed to convert visible light in a visible light wavelength band of 380 to 750 nm into light of wavelengths ranging from 450 to 600 nm which is recognizable by a user as a target of this embodiment, as depicted in FIG. 3, and the converted light is presented to the user, so that it becomes possible to allow the user to recognize a video of the field of view including the presence of the visible light having intrinsically unrecognizable wavelengths. It should be understood that, even when the wavelength band recognizable by the user exists in another wavelength band, the present invention can be implemented in the same manner.

Second Embodiment

A second embodiment of the present invention is different from the first embodiment, in that XYZ conversion is used as the wavelength conversion. The remaining configuration is the same as that in the first embodiment. The following description will be made with a focus on wavelength conversion different from that in the first embodiment.

In the second embodiment, the wavelength conversion unit 103 has: a first table including spectral chromaticity coordinates in an XYZ color system; and a second table for converting wavelengths in a first wavelength band as a part of a visible light wavelength band to which a user has degraded sensitivity as compared with a second wavelength band as the remaining part of the visible light wavelength band, into wavelengths in the second wavelength band, wherein a part of plural sets of chromaticity coordinates each associated in the first table with a respective one of the wavelengths in the first wavelength band are associated, respectively, with a part of the wavelengths in the second wavelength band, and at least a part of the remaining sets of chromaticity coordinates each associated in the first table with a respective one of the wavelengths in the second wavelength band are associated, respectively, with plural sets of chromaticity coordinates different from the sets of chromaticity coordinates each associated in the first table with a respective one of the wavelengths in the second wavelength band. In the second embodiment, these tables are stored in the internal storage part 107 provided in the wavelength conversion unit 103. Alternatively, the tables may be stored in the storage unit 105. The wavelength conversion unit 103 is operable to: acquire, based on the first video information, an XYZ signal expressing colors by the XYZ color system; identify, based on the first table, a wavelength corresponding to the XYZ signal; acquire, based on the second table, an XYZ signal for a post-conversion wavelength associated with the identified wavelength; and output second video information based on the XYZ signal for the post-conversion wavelength.

FIG. 5 shows processing using XYZ conversion to be executed as the wavelength conversion (step 402) in the second embodiment. In step 501, one frame is extracted from the first video information acquired by the imaging unit 101. The first video information acquired by the imaging unit 101 is moving image data including plural frames. For example, in moving image data of 30 fps (frames per second), 30 image frames are taken per second. In the second embodiment, with respect to each frame, processing is repeated in which the wavelength conversion unit 103 reads out one frame from the first video information and subjects the readout frame to the wavelength conversion, and then the video presentation unit 102 presents the resulting video.

In step 501, as a color signal in the one-frame video information extracted in the step 501, an RGB signal in each pixel is acquired in step 502. In a case where the RGB signal in the video information acquired from the imaging unit 101 is an sRGB signal subjected to gamma correction, the sRGB signal is subjected to inverse gamma correction to acquire an RGB signal. In other embodiments required to acquire an RGB signal, the inverse gamma correction is performed in the same manner on an as-needed basis. If a value of an RGB signal to be input into the wavelength conversion unit 103 becomes equal to or greater than a given value, the wavelength conversion is likely to fail to be adequately performed. Thus, calibration or automatic gain control (AGC) based on a reference signal may be performed to allow the RGB signal to fall within a given range. The AGC is executed based on a reference signal at an appropriate timing before the wavelength conversion. Subsequently, in step 503, this RGB signal is converted into an XYZ signal (is subjected to XYZ conversion). There have been known various conversion formulas for converting an RGB signal to an XYZ signal. In the second embodiment, the following formula (1) according to a CIE-RGB color system is used. In the formula (1), i denotes a pixel number which can take a value of 0 to a maximum i_max (pixel count−1). This XYZ conversion is performed with respect to all pixels (i=0 to i_max). Further, in step 504, a stimulus sum S[i] of tristimulus values XYZ in each pixel is acquired by calculation of the following formula (2), and stored in the internal storage part 107.

$$\begin{pmatrix} X[i] \\ Y[i] \\ Z[i] \end{pmatrix} = \begin{pmatrix} 0.4898 & 0.3101 & 0.2001 \\ 0.1769 & 0.8124 & 0.0107 \\ 0.0000 & 0.0100 & 0.9903 \end{pmatrix} \begin{pmatrix} R[i] \\ G[i] \\ B[i] \end{pmatrix} \quad (1)$$

$$S[i] = X[i] + Y[i] + Z[i] \quad (2)$$

Subsequently, in step 505, a set of acquired XYZ values is divided by the stimulus sum S[i] to acquire a set of normalized xyz values with respect to all the pixels.

$$\begin{pmatrix} x[i] \\ y[i] \\ z[i] \end{pmatrix} = \frac{1}{L[i]} \begin{pmatrix} X[i] \\ Y[i] \\ Z[i] \end{pmatrix} \quad (3)$$

Figure 6A:
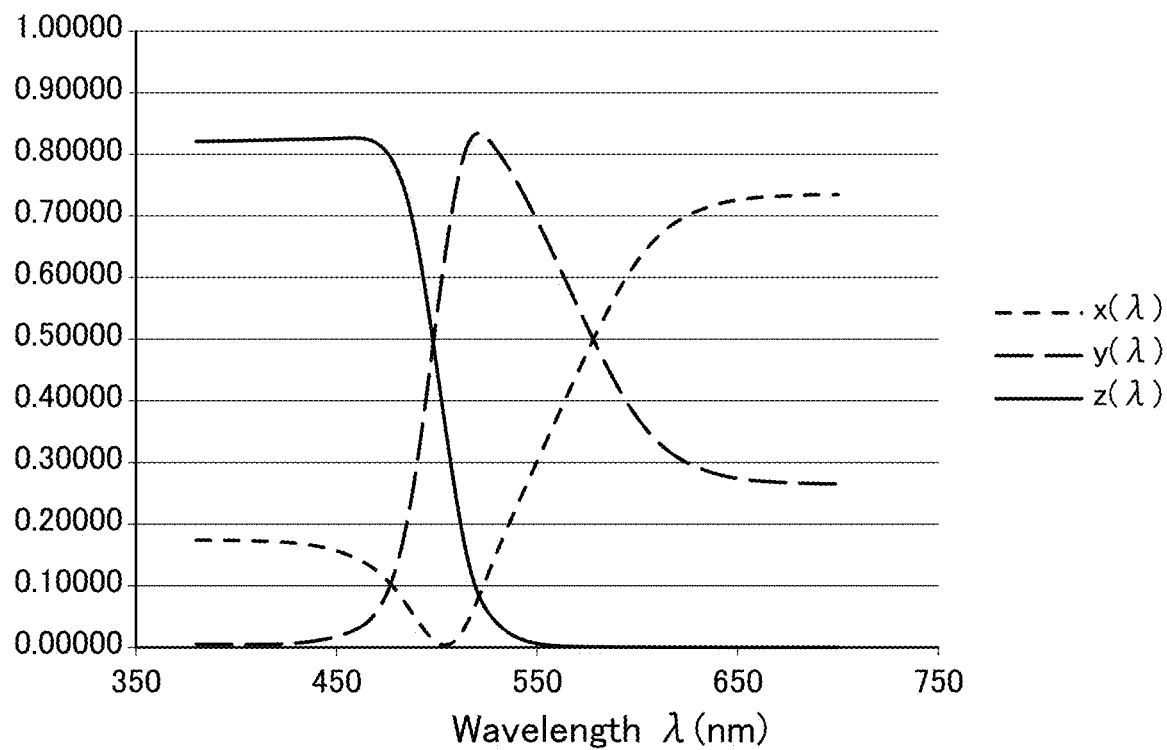
FIG. 6A is a graph representing spectral chromaticity coordinates in an XYZ color system to be used in the head-mounted video presentation device according to the second embodiment.

In step 506, based on the set of normalized xyz values and spectral chromaticity coordinates in the XYZ color system, a wavelength in each pixel is identified. The spectral chromaticity coordinates may be expressed as any format as long as they indicate a correspondence relationship between the set of normalized xyz values and a wavelength. In the second embodiment, spectral chromaticity coordinates in an XYZ color system created by the CIE as shown in Table 1 and FIG. 6A are used. The spectral chromaticity coordinates in the XYZ color system themselves are well known by a person of ordinary skill in the art. Thus, in Table 1, only a wavelength band necessary for explanation is shown, and the second wavelength band is omitted for the sake of simplification. Further, in the second embodiment, spectral chromaticity coordinates covering a wavelength band of 380 to 700 nm is used. Alternatively, it is possible to use spectral chromaticity coordinates covering a narrower or wider wavelength band, e.g., a wavelength band of 380 to 750 nm. Even in such a case, the present invention can be obviously realized in the same manner.

TABLE 1

| Wavelength (nm) | x (λ) | y (λ) | z (λ) |
| --- | --- | --- | --- |
| 380 | 0.17411 | 0.00496 | 0.82093 |
| 381 | 0.17409 | 0.00496 | 0.82095 |
| 382 | 0.17407 | 0.00497 | 0.82096 |
| 383 | 0.17406 | 0.00498 | 0.82096 |
| 384 | 0.17404 | 0.00498 | 0.82098 |
| 385 | 0.17401 | 0.00498 | 0.82101 |
| 386 | 0.17397 | 0.00497 | 0.82106 |
| 387 | 0.17393 | 0.00494 | 0.82113 |
| 388 | 0.17389 | 0.00493 | 0.82118 |
| 389 | 0.17384 | 0.00492 | 0.82124 |

TABLE 1-continued

| Wavelength (nm) | x (λ) | y (λ) | z (λ) |
| --- | --- | --- | --- |
| 390 | 0.17380 | 0.00492 | 0.82128 |
| 391 | 0.17376 | 0.00492 | 0.82132 |
| 392 | 0.17370 | 0.00494 | 0.82136 |
| 393 | 0.17366 | 0.00494 | 0.82140 |
| 394 | 0.17361 | 0.00494 | 0.82145 |
| 395 | 0.17356 | 0.00492 | 0.82152 |
| 396 | 0.17351 | 0.00490 | 0.82159 |
| 397 | 0.17347 | 0.00486 | 0.82167 |
| 398 | 0.17342 | 0.00484 | 0.82174 |
| 399 | 0.17338 | 0.00481 | 0.82181 |
| 400 | 0.17334 | 0.00480 | 0.82186 |
| 401 | 0.17329 | 0.00479 | 0.82192 |
| 402 | 0.17324 | 0.00478 | 0.82198 |
| 403 | 0.17317 | 0.00478 | 0.82205 |
| ... | ... | ... | ... |
| 689 | 0.73434 | 0.26566 | 0.00000 |
| 690 | 0.73439 | 0.26561 | 0.00000 |
| 691 | 0.73444 | 0.26556 | 0.00000 |
| 692 | 0.73448 | 0.26552 | 0.00000 |
| 693 | 0.73452 | 0.26548 | 0.00000 |
| 694 | 0.73456 | 0.26544 | 0.00000 |
| 695 | 0.73459 | 0.26541 | 0.00000 |
| 696 | 0.73462 | 0.26538 | 0.00000 |
| 697 | 0.73465 | 0.26535 | 0.00000 |
| 698 | 0.73467 | 0.26533 | 0.00000 |
| 699 | 0.73469 | 0.26531 | 0.00000 |
| 700 | 0.73469 | 0.26531 | 0.00000 |

The set of xyz values in each pixel acquired in the step 505 are compared with a set of xyz values in Table 1 to identify a corresponding wavelength λ. For example, first of all, the comparison is performed using the x value as a reference value to identify one or more wavelengths associated with an x value identical to the reference value or x values close to the reference value, as candidates. Subsequently, the comparison are sequentially performed using the y value and the z value as reference values to identify a wavelength associated with a set of xyz values identical to or closest to the reference values, as a wavelength in the pixel.

In a case where a set of acquired xyz values in a pixel i is composed of x[i]=0.17332, y[i]=0.00482, and z[i]=0.82188 (this is expressed as xyz[i]=(0.17332, 0.00482, 0.82188)), a candidate wavelength λ is selected using the x value as a reference value. In Table 1, there is no wavelength λ associated with an x value=0.17332. Thus, a wavelength λ=400 nm associated with the closest x value (0.17344), a wavelength λ=401 nm associated with the second-closest x value (0.17329) and a wavelength λ=399 nm associated with the third-closest x value (0.17338) are selected as candidates. Then, among the candidate wavelengths λ=399 nm, 400 nm and 401 nm, the wavelength λ=399 nm associated with a y value (0.00481) closest to y[i]=0.00482 and the wavelength λ=400 nm associated with the second-closest y value (0.00480) are narrowed down as candidates. Further, in the candidate wavelengths λ=399 nm and 400 nm, the wavelength λ=400 nm associated with a z value (0.82186) closer to z[i]=0.82188 is identified as a wavelength in the pixel i. Alternatively, it is possible to calculate a correlation between the set of acquired xyz values in a pixel i and a set of xyz values in Table 1 by any of various methods, and select a wavelength having the largest correlation to identify a wavelength λ in the pixel i, which is apparent to a person of ordinary skill in the art.

This wavelength identification is performed with respect to all the pixels to identify a wavelength λ[i] with respect to each pixel. In the second embodiment, the spectral chromaticity coordinates covering a wavelength band of 380 to 700 nm are used. Thus, even when any wavelength beyond this coverage is input, only wavelengths in a wavelength band of 380 to 700 nm are identified using the spectral chromaticity coordinates, in the above manner.

Subsequently, in step 507, wavelength conversion is performed. In the wavelength conversion, wavelengths in a part of a visible light wavelength band which is unrecognizable by the user due to the degradation of sensitivity are converted into wavelengths in the remaining part of the visible light wavelength band which is recognizable by the user. In the second embodiment, wavelengths in the user recognizable wavelength band are also converted into different wavelengths in the user recognizable wavelength band. Alternatively, only the part of the visible light wavelength band to which the user has degraded sensitivity may be subjected to the wavelength conversion. In the second embodiment, the wavelength conversion is performed using the following wavelength conversion table.

TABLE 2

| Pre-Conversion Wavelength λ (nm) | Post-Conversion Wavelength λ (nm) | x (λ) | y (λ) | z (λ) |
| --- | --- | --- | --- | --- |
| 380 | 450 | 0.15654 | 0.01771 | 0.82565 |
| 381 |  | 0.15612 | 0.01816 | 0.82572 |
| 382 | 451 | 0.15560 | 0.01861 | 0.82579 |
| 383 |  | 0.15506 | 0.01909 | 0.82586 |
| 384 | 452 | 0.15452 | 0.01956 | 0.82592 |
| 385 |  | 0.15396 | 0.02006 | 0.82599 |
| 386 | 453 | 0.15340 | 0.02055 | 0.82605 |
| 387 |  | 0.15281 | 0.02108 | 0.82611 |
| 389 | 454 | 0.15222 | 0.02161 | 0.82617 |
| 390 |  | 0.15161 | 0.02218 | 0.82622 |
| 391 | 455 | 0.15099 | 0.02274 | 0.82627 |
| 392 |  | 0.15034 | 0.02335 | 0.82632 |
| 393 | 456 | 0.14969 | 0.02395 | 0.82636 |
| 394 |  | 0.14902 | 0.02460 | 0.82639 |
| 395 | 457 | 0.14834 | 0.02525 | 0.82641 |
| 396 |  | 0.14764 | 0.02594 | 0.82643 |
| 397 | 458 | 0.14693 | 0.02663 | 0.82644 |
| 398 |  | 0.14620 | 0.02738 | 0.82643 |
| 399 | 459 | 0.14547 | 0.02812 | 0.82641 |
| 400 |  | 0.14472 | 0.02891 | 0.82638 |
| 401 | 460 | 0.14396 | 0.02970 | 0.82634 |
| 402 |  | 0.14319 | 0.03055 | 0.82627 |
| 403 | 461 | 0.14241 | 0.03139 | 0.82620 |
| ... | ... | ... | ... | ... |
| 689 | 595 | 0.60293 | 0.39650 | 0.00057 |
| 690 |  | 0.60548 | 0.39396 | 0.00057 |
| 691 | 596 | 0.60803 | 0.39141 | 0.00056 |
| 693 |  | 0.61051 | 0.38895 | 0.00055 |
| 694 | 597 | 0.61298 | 0.38648 | 0.00054 |
| 695 |  | 0.61538 | 0.38410 | 0.00053 |
| 696 | 598 | 0.61778 | 0.38171 | 0.00051 |
| 697 |  | 0.62012 | 0.37938 | 0.00050 |
| 698 | 599 | 0.62246 | 0.37705 | 0.00049 |
| 699 |  | 0.62475 | 0.37477 | 0.00048 |
| 700 | 600 | 0.62704 | 0.37249 | 0.00047 |

In the wavelength conversion table in Table 2, the columns "Pre-Conversion Wavelength λ(nm)" and "Post-Conversion Wavelength λ(nm)" present, respectively, wavelengths before the wavelength conversion, and wavelengths after the wavelength conversion (converted wavelength). Further the columns "x(λ)", "y(λ)" and "z(λ)" present, respectively, x(λ) values, y(λ) values and z(λ) values for expressing the respective post-conversion wavelengths λ. That is, in this wavelength conversion table, a post-conversion wavelength λ (nm) and a set of xyz values for expressing the post-conversion wavelength λ (nm) are assigned to each pre-conversion wavelength λ (nm). For example, 450 nm as the post-conversion wavelength λ (nm) and a set of xyz values (0.15664, 0.01771, 0.82565) for expressing a post-conversion wavelength of 450 nm are assigned to a pre-conversion wavelength λ (nm)=380 nm. The xyz values for expressing the post-conversion wavelength λ (nm) are acquired from the table of spectral chromaticity coordinates in the XYZ color system shown in Table 1. It should be noted here that, although the post-conversion wavelength λ (nm) is written in Table 2 for the sake of facilitating understanding of the invention, it needs not be included in actual information processing.

Forming this wavelength conversion table, post-conversion wavelengths in a wavelength band of 450 to 600 nm, with respect to wavelengths in a visible light wavelength band of 380 to 700 nm, are determined by linear approximation or first-order approximation calculation, using the following formula (4).

$$\text{Post} - \text{conversion wavelength } \lambda = \frac{600 - 450}{700 - 380} \times (\text{pre} - \text{conversion wavelength } \lambda - 380) + 450 \quad (4)$$

In the spectral chromaticity coordinates in the XYZ color system, a set of xyz values is indicated simply in increments of 1 nm. Thus, when the post-conversion wavelength calculated using the formula (4) includes a decimal point, it is appropriately subjected to rounding off, truncation, rounding up or the like, and then a set of xyz values is assigned to the resulting integer post-conversion wavelength. Further, in the spectral chromaticity coordinates in the XYZ color system, a set of xyz values is indicated in increments of 1 nm over a wavelength band of 450 to 600 nm, i.e., is indicated with respect to 151 wavelengths. On the other hand, in order to assign a set of xyz values in increments of 1 nm over a wavelength band of 380 to 700 nm, 321 sets of xyz values are required. Thus, the number of sets of xyz values indicated in the spectral chromaticity coordinates becomes insufficient. Therefore, in the second embodiment, a set of xyz values indicated in the table of spectral chromaticity coordinates in the XYZ color system in increments of 1 nm from 450 nm is assigned to a pre-conversion wavelength indicated in increments of 1 or 2 nm from 380 nm, and, with regard to the pre-conversion wavelength to which no set of xyz values is assigned, the field of the "Post-Conversion Wavelength λ(nm)" is left blank, and a set of xyz values therefor is calculated by linear interpolation based on two sets of xyz values assigned to adjacent wavelengths. This interpolation method is not limited to n-order approximation (n=1 or more), but any other suitable method may be used.

For example, the set of xyz values (0.15664, 0.01771, 0.82565) for expressing the post-conversion wavelength of 450 nm are assigned to a pre-conversion wavelength of 380 nm, and a set of xyz values (0.15660, 0.01861, 0.82579) for expressing a post-conversion wavelength of 451 nm are assigned to a pre-conversion wavelength of 382 nm. Then, with respect to a pre-conversion wavelength of 381 nm therebetween, a set of xyz values (0.15612, 0.01816, 0.82572) which are intermediate values between (average values of) the sets of xyz values for the post-conversion wavelengths 450 nm and 451 nm is assigned.

In the second embodiment, in the step 507, the identified wavelength is converted using the above wave conversion table. For example, in a case where the wavelength λ [i] identified in the step 506 is 399 nm, the row "pre-conversion wavelength λ (nm)=399 nm" is retrieved. Through the retrieval, the post-conversion wavelength λ is identified as 459 nm, and (0.14547, 0.02812, 0.82641) assigned as a set of xyz values for expressing the identified post-conversion wavelength λ is output. That is, as xyz[i] in a pixel i having the set of xyz values expressing a wavelength of 399 nm, the set of xyz values (0.14547, 0.02812, 0.82641) expressing a wavelength of 459 nm is output, so that a wavelength in the pixel i is converted from 399 nm into 459 nm.

Then, in step 508, the stimulus sum S[i] in each pixel i is read out from the internal storage part 107, and the converted xyz [i] in the pixel i is multiplied by the read-out stimulus sum S[i], to thereby acquire a set of XYZ values after wavelength conversion, as represented by the following formula (5). Then, in step 509, the set of XYZ values after wavelength conversion is subjected to RGB conversion, based on the following formula (6), and, in step 510, the resulting RGB signal is output to the video presentation unit 102.

$$\begin{pmatrix} X[i] \\ Y[i] \\ Z[i] \end{pmatrix} = S[i] \begin{pmatrix} x[i] \\ y[i] \\ z[i] \end{pmatrix} \quad (5)$$

$$\begin{pmatrix} R[i] \\ G[i] \\ B[i] \end{pmatrix} = \begin{pmatrix} 2.3655 & -0.8971 & -0.4683 \\ -0.5151 & 1.4264 & 0.0887 \\ 0.0052 & -0.0144 & 1.0089 \end{pmatrix} \begin{pmatrix} X[i] \\ Y[i] \\ Z[i] \end{pmatrix} \quad (6)$$

Subsequently, in the step 403, the video presentation unit 102 presents a video to the user, based on the RGB signal output from the wavelength conversion unit 103 in the step 507. In this process, the RGB signal may be subjected to gamma correction, as needed basis. Similarly, in other embodiments in which an RGB signal is output, the RGB signal may be subjected to gamma correction, as needed basis.

After presenting one frame of video through the above processing, the routine returns to the step 402. Then, with regard to the next frame, the aforementioned wavelength conversion (step 402) and video presentation (step 403) in the second embodiment are performed. In the second embodiment, the wavelength conversion (step 402) and the video presentation (step 403) are performed with respect to each frame. Alternatively, the video presentation may be performed after subjecting plural frames to wavelength conversion in one lump.

Figure 6B:
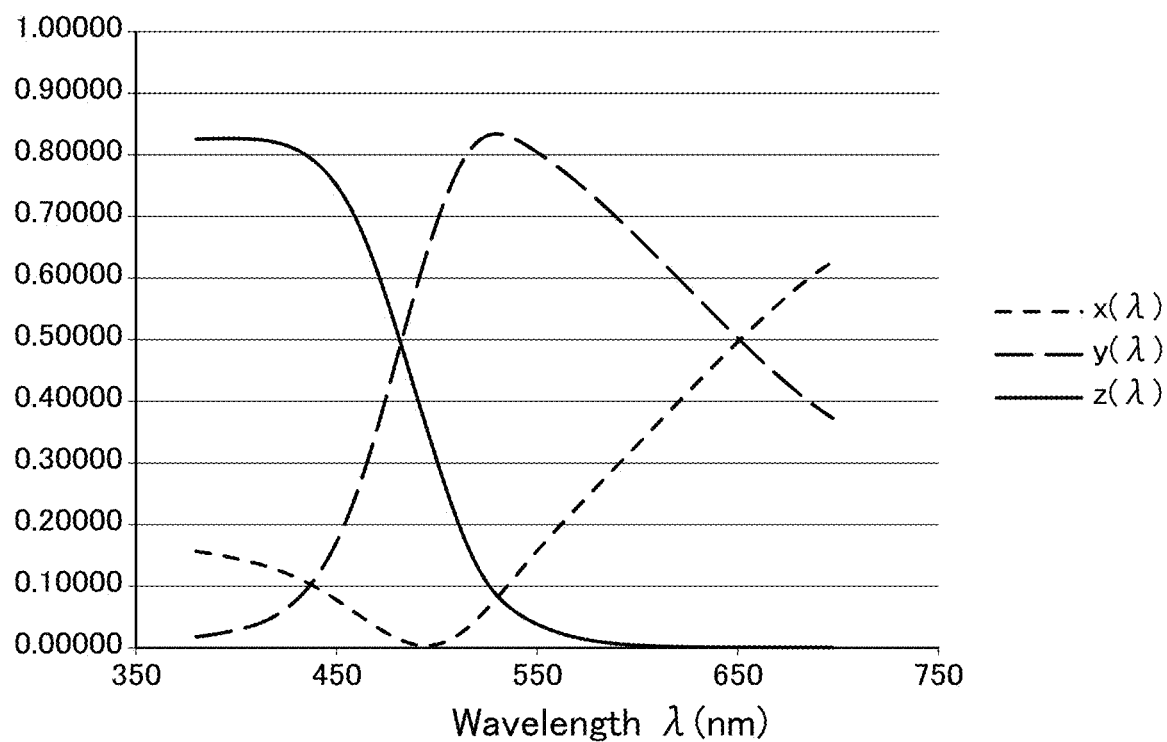
FIG. 6B is a graph representing spectral chromaticity coordinates in the XYZ color system to be used in the head-mounted video presentation device according to the second embodiment.

In the second embodiment, wavelengths in the entire visible light wavelength band of 380 to 700 nm are converted into wavelengths in a user recognizable wavelength band of 450 to 600 nm. Spectral chromaticity coordinates in the XYZ color system before and after the conversion are graphically represented in FIG. 6, wherein FIG. 6A is a graph before the conversion, and FIG. 6B is a graph after the conversion. In the graph before the conversion (FIG. 6A), plural sets of original xyz values for expressing respective wavelengths in a wavelength band of 380 to 700 are assigned, respectively, to the wavelengths. On the other hand, in the graph after the conversion (FIG. 6B), instead of the plural sets of original xyz values, plural sets of xyz values for expressing respective wavelengths in a wavelength band of 450 to 600 nm are assigned approximately evenly over a wavelength band of 380 to 700. Thus, it can be understood that a region ranging from 450 to 600 nm in the graph of FIG. 6A is assigned to a wavelength band of 380 to 700 in FIG. 6B, in a horizontally stretched form. In the graph after the conversion, the set of xyz values for expressing a wavelength of 450 nm is assigned to a wavelength of 380 nm. Thus, upon an input of 380 nm into a pixel, an output based on the set of xyz values for 450 nm is provided from the video presentation unit 102, and light having a wavelength of 450 nm is observed by the user.

Therefore, through the use of the processing in the second embodiment, even in a situation where visible light includes a wavelength band intrinsically unrecognizable by a user due to the degradation in sensitivity, wavelengths in such a wavelength band are converted into wavelengths to which the user has relatively good sensitivity, so that the user can observe the visible light as light including the converted wavelengths. Further, pre-conversion wavelengths are approximately linearly assigned to a recognizable wavelength band, so that it is possible to allow the user to recognize expression such as a color relationship between adjacent areas, in a form close to actual color expression.

The second embodiment has been described based on an example where wavelengths in a visible light wavelength band of 380 to 700 nm are converted into a wavelength band of 450 to 600 nm, i.e., one continuous wavelength band is converted to one different continuous wavelength band. Alternatively, it is obviously possible to convert one continuous wavelength band to two or more separate wavelength bands, or convert two or more separate wavelength bands to two or more different separate wavelength bands, in the same manner as that described above.

Third Embodiment

A third embodiment of the present invention is different from the first and second embodiments in terms of the wavelength conversion. The remaining configuration is the same as that in the first and second embodiments. The following description will be made with a focus on wavelength conversion different from that in the first and second embodiments.

Figure 4:
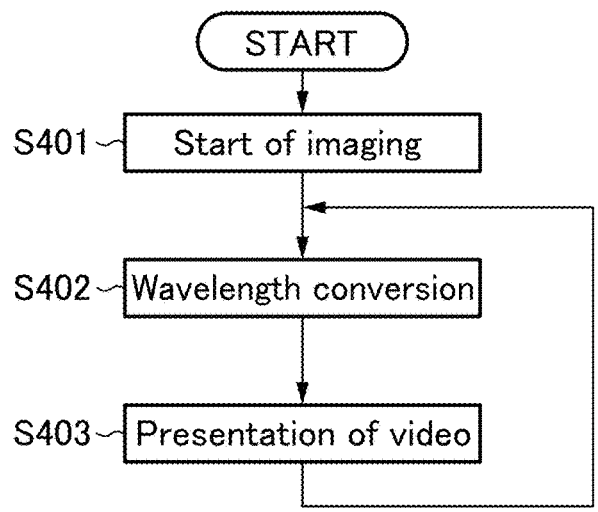
FIG. 4 is a flowchart showing information processing in the head-mounted video presentation device according to the first embodiment.
Figure 7:
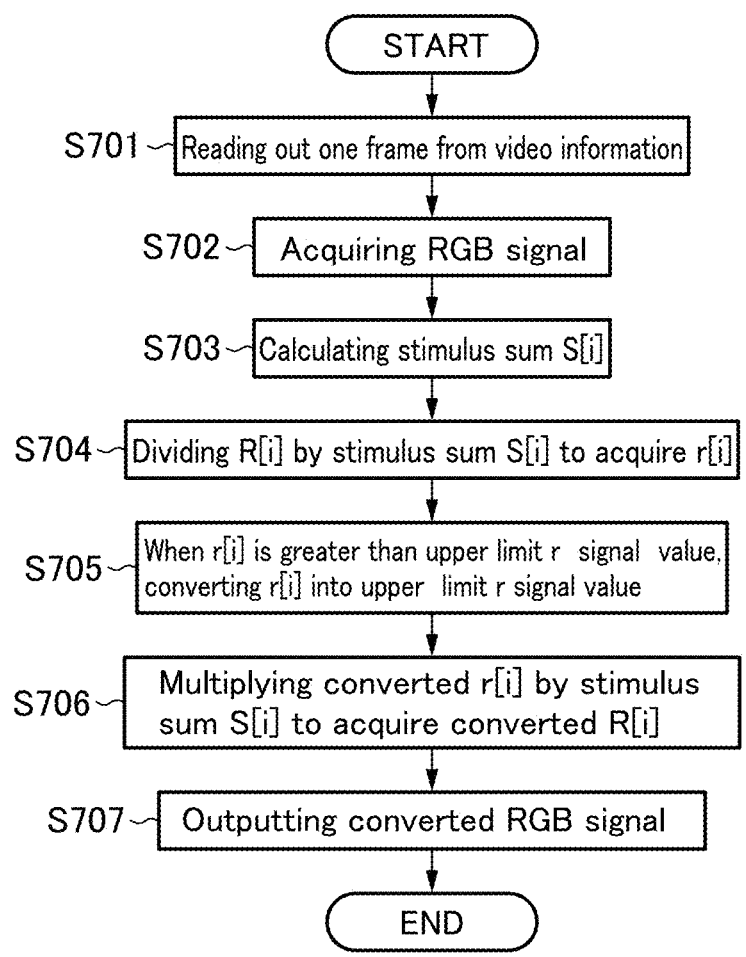
FIG. 7 is a flowchart showing information processing in a head-mounted video presentation device according to a third embodiment of the present invention.

In the third embodiment, in the wavelength conversion step 402 in FIG. 4, wavelength conversion is performed based on the RGB signal without performing the XYZ conversion. The wavelength conversion step 402 in the third embodiment will be described based on the flowchart depicted in FIG. 7. In step 701, the wavelength conversion unit 103 reads out one frame from the first video information acquired from the imaging unit 101, and, in step 702, the wavelength conversion unit 103 acquires an RGB signal in each pixel of the read-out frame, in the same manner as that in the second embodiment. Then, in step 703, a stimulus sum S[i] in each pixel is calculated based on the RGB signal, using the following formula (7) derived from the formula (1), and stored in the internal storage part 107. Alternatively, the stimulus sum S[i] may be calculated using an approximation formula or the like.

$$S[i] = X[i] + Y[i] + Z[i] = \begin{pmatrix} 0.6667 \\ 1.1325 \\ 1.2011 \end{pmatrix} \begin{pmatrix} R[i] \\ G[i] \\ B[i] \end{pmatrix} \quad (7)$$

In the formula (7), R[i], G[i] and B[i] denote, respectively, a value of an R signal, a value of a G signal and a value of a B signal in a pixel i. On the other hand, values obtained by dividing R[i], G[i] and B[i] by the stimulus sum S[i] are denoted, respectively, by r[i], g[i] and b[i]. In step 704, R[i] in each pixel is divided by the stimulus sum S[i] to calculate r[i].

Figure 8A:
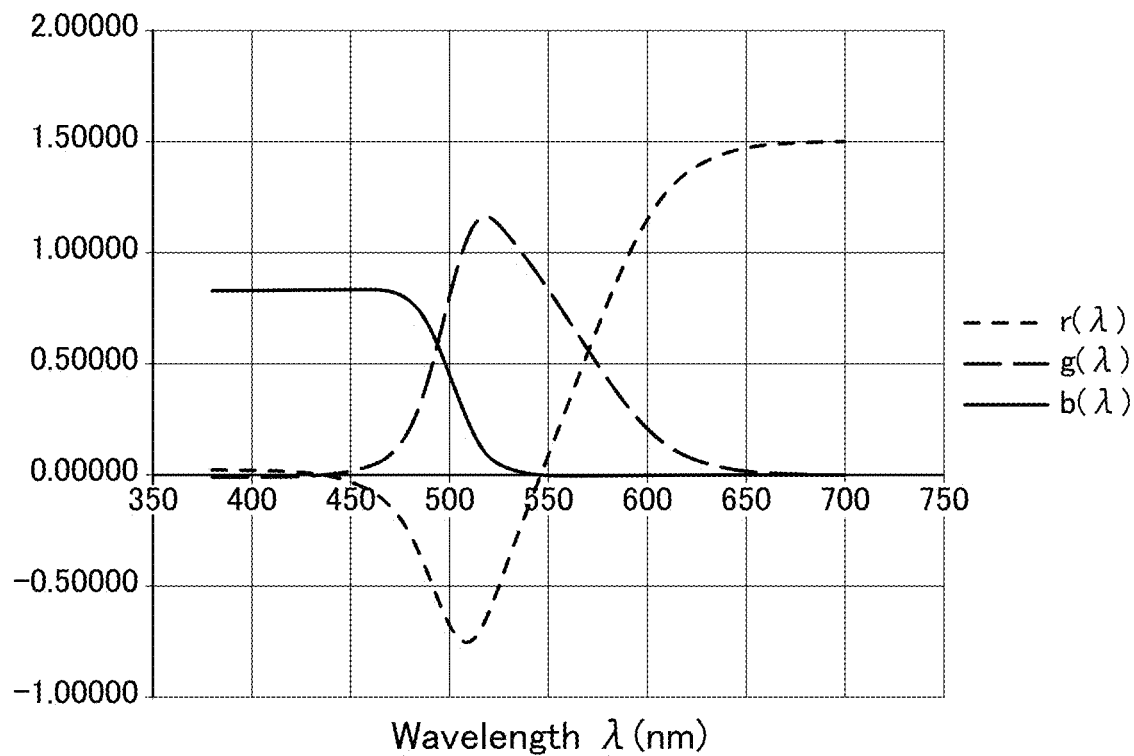
FIG. 8A is a graph representing spectral chromaticity coordinates in an RGB color system to be used in the head-mounted video presentation device according to the third embodiment.

In step 705, it is determined whether or not r[i] in each pixel is greater than an upper limit of the r signal. When r[i]

is determined to be greater than the upper limit of the r signal, r[i] is converted to the upper limit. On the other hand, when r[i] is determined to be equal to or less than the upper limit, r[i] is directly output as a converted r[i] without performing the conversion. Spectral chromaticity coordinates in the XYZ color system to be used in the third embodiment are shown in Table 3 and FIG. 8A. The spectral chromaticity coordinates in the XYZ color system to be used in the third embodiment are prepared by subjecting the spectral chromaticity coordinates in the XYZ color system created by the CIE as shown in Table 1 and FIG. 6A to the RGB conversion represented by the formula (6). A set of rgb signal values shown in Table 3 and FIG. 8 is obtained by subjecting the set of normalized xyz signal values shown in the spectral chromaticity coordinates in the XYZ color system to the RGB conversion. The spectral chromaticity coordinates in the RGB color system may be expressed as any format as long as they indicate a correspondence relationship between the set of rgb signal values and a wavelength, based on the spectral chromaticity coordinates in the XYZ color system. Assume a patient whose recognizable visual light wavelength band is limited to 450 to 600 nm due to retinal degenerative disease. In this case, even if an RGB signal for expressing wavelengths greater than 600 nm is output, the patient cannot recognize the signal. As is evident from FIG. 8A, in a wavelength band of greater than 600 nm, the R signal is highly dominant as compared with the G and B signals. Therefore, in the third embodiment, on the assumption that a maximum value of a user recognizable r signal, i.e., a value of the r signal at a wavelength of 600 nm, is defined as an upper limit of the r signal, when r[i] in each pixel i is greater than the upper limit of the r signal, r[i] is converted into the upper limit of the r signal, so that it is possible to prevent light having a wavelength greater than about 600 nm from being presented by the video presentation unit 102. A value of the r signal (1.14888) at a wavelength of 600 nm is acquired from the spectral chromaticity coordinates shown in Table 3 and FIG. 8A. The upper limit of the r signal may be any value which is equal to less than the maximum value of the r signal in the user recognizable wavelength band.

TABLE 3

| Wavelength (nm) | r (λ) | g (λ) | b (λ) |
|---|---|---|---|
| 380 | 0.02297 | −0.00979 | 0.82907 |
| 381 | 0.02291 | −0.00978 | 0.82909 |
| 382 | 0.02285 | −0.00976 | 0.82910 |
| 383 | 0.02282 | −0.00974 | 0.82910 |
| 384 | 0.02276 | −0.00972 | 0.82912 |
| 385 | 0.02267 | −0.00971 | 0.82915 |
| 386 | 0.02257 | −0.00969 | 0.82920 |
| 387 | 0.02246 | −0.00971 | 0.82927 |
| 388 | 0.02236 | −0.00970 | 0.82932 |
| 389 | 0.02222 | −0.00968 | 0.82938 |
| 390 | 0.02210 | −0.00966 | 0.82942 |
| 391 | 0.02199 | −0.00963 | 0.82946 |
| 392 | 0.02181 | −0.00957 | 0.82950 |
| 393 | 0.02170 | −0.00955 | 0.82954 |
| 394 | 0.02156 | −0.00952 | 0.82959 |
| 395 | 0.02142 | −0.00951 | 0.82966 |
| ... | ... | ... | ... |
| 477 | −0.22115 | 0.16424 | 0.80048 |
| 478 | −0.23542 | 0.17868 | 0.79478 |
| 479 | −0.25050 | 0.19427 | 0.78846 |
| 480 | −0.26650 | 0.21109 | 0.78148 |
| 481 | −0.28342 | 0.22918 | 0.77382 |
| ... | ... | ... | ... |
| 516 | −0.69120 | 1.15743 | 0.12492 |
| 517 | −0.67426 | 1.16101 | 0.11214 |
| 518 | −0.65586 | 1.16241 | 0.10060 |
| 519 | −0.63611 | 1.16174 | 0.09027 |
| 520 | −0.61528 | 1.15921 | 0.08110 |
| ... | ... | ... | ... |
| 598 | 1.11869 | 0.22630 | −0.00177 |
| 599 | 1.13395 | 0.21724 | −0.00170 |
| 600 | 1.14888 | 0.20837 | −0.00163 |
| 601 | 1.16349 | 0.19970 | −0.00156 |
| 603 | 1.19166 | 0.18298 | −0.00143 |
| ... | ... | ... | ... |
| 699 | 0.73469 | 0.26531 | 0.00000 |
| 700 | 0.73469 | 0.26531 | 0.00000 |

Subsequently, in step 706, the converted r[i] is multiplied by the stimulus sum S[i] in the pixel i to acquire a converted R[i]. Then, in step 707, a value of the R signal included in the RGB signal in each pixel, output from the imaging unit 106, is replaced with the converted value of the R signal, and an RGB signal including the converted value of the R signal is output from the wavelength conversion unit 103 to the video presentation unit 102. On the other hand, with regard to G and B signals, values output from the imaging unit 106 are directly used without performing any conversion. Then, the video presentation unit 102 presents the frame based on the converted RGB signal (step 403).

Figure 8B:
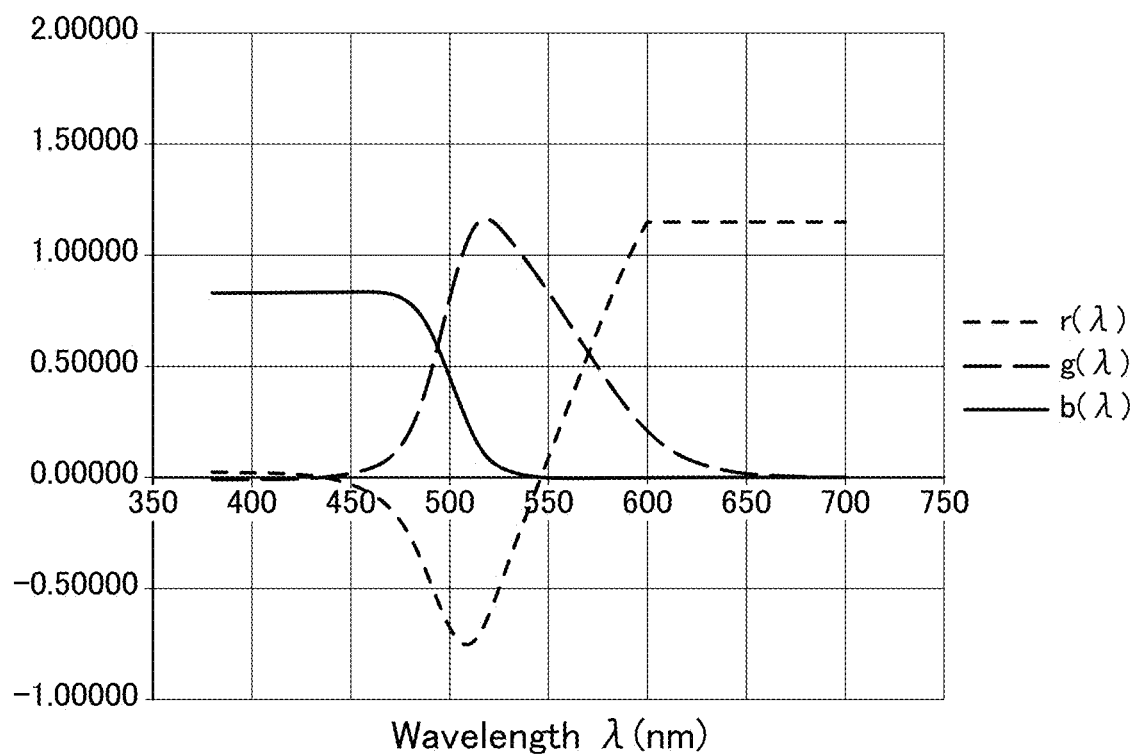
FIG. 8B is a graph representing spectral chromaticity coordinates in the RGB color system to be used in the head-mounted video presentation device according to the third embodiment.

Through the above conversion, as depicted in FIG. 8B, the upper limit of the r signal is output as r[i] at a wavelength of greater than 600 nm, so that, even when light having a wavelength of greater than 600 nm are taken by the imaging unit 101, light having a wavelength of about 600 nm is presented by the video presentation unit.

Therefore, through the use of the processing in the third embodiment, even a user incapable of recognizing a wavelength of greater than 600 nm can observe light of wavelengths greater than 600 nm as light of wavelength around 600 nm via the video presentation unit 102. Light in a wavelength band of equal to or less than 600 nm is output with original wavelengths, so that it is possible to allow the user to recognize expression such as a color relationship between adjacent areas, in the form of actual color expression. Further, in the third embodiment, it is preferable that wavelength conversion with respect to the field of view of the user is executed in real time to provide a view to the user in real time, like eyeglasses. However, in a device such as a head-mounted display to be mounted to the head of a user, a processing ability of hardware is limited in some cases. However, in the third embodiment, without going through the XYZ conversion, the RGB signal is directly processed to realize the wavelength conversion, so that information processing can be minimized. This makes it possible to present a wavelength-converted video in real time, even under limited hardware resources.

Fourth Embodiment

A fourth embodiment of the present invention is identical to the third embodiment in that the processing for a value of the RGB signal is executed without involving the XYZ conversion, but different from the third embodiment in terms of a specific wavelength conversion. The following description will be made with a focus on wavelength conversion different from that in the third embodiment. The fourth embodiment is based on an assumption that each of R, G and B signal values in an RGB signal acquired from the imaging unit 101 does not take a negative value.

Based on the flowchart depicted in FIG. 9, specific processing of the wavelength conversion step 402 in the fourth embodiment will be described. Steps 901 to 903 are the same as the steps 701 to 703 in the third embodiment. In step 904, R[i] and G[i] in each pixel are divided by the stimulus sum S[i] to acquire r[i] and g[i]. Then, in step 905, when r[i] is greater than an upper limit of the r signal, r[i] is converted to the upper limit of the r signal, and, in step 906, when g[i] is less than a lower limit of the g signal, g[i] is converted to the lower limit of the g signal.

In the fourth embodiment, based on Table 3 and the graph representing the spectral chromaticity coordinates in the RGB color system depicted in FIG. 8A, a value of the r signal (1.114888) and a value of the g signal (0.20837) are determined, respectively, as the upper limit of the r signal and the lower limit of the g signal. The upper limit of the r signal is preferably set to a maximum one of values of the r signal for the user recognizable wavelength band. In the fourth embodiment, the imaging unit 101 is configured not to output a negative value. That is, any value indicated as a negative value in the spectral chromaticity coordinates in the RGB color system shown in Table 3 and FIG. 8A is read as 0. For example, a value of the r signal in a wavelength band of 450 to 500 nm is 0, and a maximum one of values of the r signal in this wavelength band is 0, so that the upper limit of the r signal is set to 0. On the other hand, the lower limit of the g signal is set to a greater one of values of the g signal for wavelengths at both edges of the user recognizable wavelength band. In the fourth embodiment, assume that the user recognizable wavelength band is in the range of 450 to 600 nm. Comparing values of the g signal at both edges of this wavelength band, the value of the g signal for a wavelength of 600 nm is greater than the other. Thus, the lower limit of the g signal is set to the value of the g signal for 600 nm. On the other hand, for example, assume that the user recognizable wavelength band is in the range of 500 to 600 nm. In this case, a value of the g signal for a wavelength of 500 nm is greater than the other. Thus, the lower limit of the g signal is set to the value of the g signal for 500 nm. As seen in FIG. 8A, the graph representing the spectral chromaticity coordinates in the RGB color system has an upwardly convex shape. Thus, by setting the value of the g signal to be equal to or greater than the lower limit of the g signal as mentioned above, it is possible to prevent light of wavelengths unrecognizable by the user from being presented.

Subsequently, the wavelength conversion unit 103 multiplies the converted r[i] and g[i] by the stimulus sum S[i] to acquire a converted R[i] and a converted G[i] (step 907), and outputs a converted RGB signal including these acquired values (step 908). With respect to B[i], a non-converted value is used. The video presentation unit 102 presents a video based on the converted RGB signal (step 403).

The value of the r signal and the value of the g signal are converted in the above manner. Thus, a graph representing spectral chromaticity coordinates output in the fourth embodiment is formed as depicted in FIG. 10. Specifically, in a wavelength band of greater than 600 nm, each of the values of the r and g signals is output as a value for a wavelength of 600 nm. In FIG. 8A, although the value of the b signal for a wavelength of greater than 600 nm has a negative value, the imaging unit 101 in the fourth embodiment is configured to output 0 when the value of the b signal has a negative value. Thus, even when the imaging unit 101 takes a video under light having a wavelength of greater than 600 nm, the video is converted into an RGB signal for 600 nm through the wavelength conversion in the fourth embodiment, and a video with 600 nm is presented.

Further, when g [i] is less than the lower limit of the g signal (0.20837) in a relatively short wavelength band, g [i] is converted into the lower limit of the g signal, and the converted g [i] is output. Specifically, in the fourth embodiment, g [i] reaches the lower limit of the g signal at a wavelength of 479 nm, and, when the wavelength becomes shorter than 479 nm, g [i] is converted into the lower limit of the g signal, so as to prevent g [i] from becoming less than the lower limit of the g signal. In a wavelength band of less than 479 nm, each of the values of the r signal and the b signal becomes an approximately constant value. Thus, by fixing the value of the g signal to the lower limit of the g signal, light of wavelength of about 479 nm is radiated in this wavelength band.

In the third embodiment, with a focus on the fact that, the r signal is highly dominant in a wavelength band of greater than 600 nm, only the r signal is subjected to the wavelength conversion. In the fourth embodiment, in a wavelength band of greater than 600 nm, a value of the g signal for 600 nm is output, in the same manner as that for the r signal. Through the use of the processing in the fourth embodiment, even when the imaging unit 101 takes a video under light having a wavelength band of less than 450 nm and a wavelength band of greater than 600 nm, only a video having a wavelength band of about 479 to 600 nm is presented from the video presentation unit 102, so that even a user which can recognize only a wavelength band of 450 to 600 nm becomes able to recognize a video having entire wavelengths in a visible light wavelength band. In a wavelength band of 479 to 600 nm, a video is output at original wavelengths, so that it is possible to allow the user to recognize expression such as a color relationship between adjacent areas, in a form close to actual color expression. Further, the wavelength conversion can be executed without involving the XYZ conversion, as with the third embodiment, so that it is possible to realize high-speed processing.

Fifth Embodiment

A fifth embodiment of the present invention is identical to the third and fourth embodiments in that the processing for an RGB signal is executed without involving the XYZ conversion, but different from the third and fourth embodiments in terms of a specific wavelength conversion. The following description will be made with a focus on wavelength conversion different from those in the third and fourth embodiments. The fourth embodiment is also based on the assumption that each of R, G and B signal values in an RGB signal acquired from the imaging unit 101 does not take a negative value.

Figure 11:
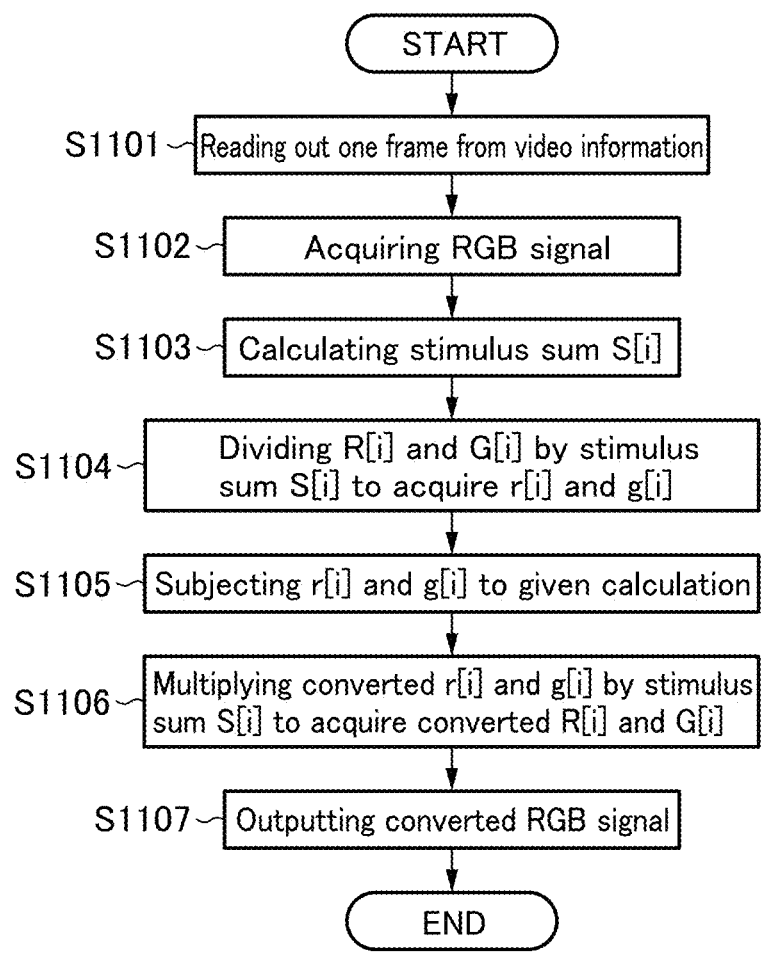
FIG. 11 is a flowchart showing information processing in a head-mounted video presentation device according to a fifth embodiment of the present invention.
Figure 12:
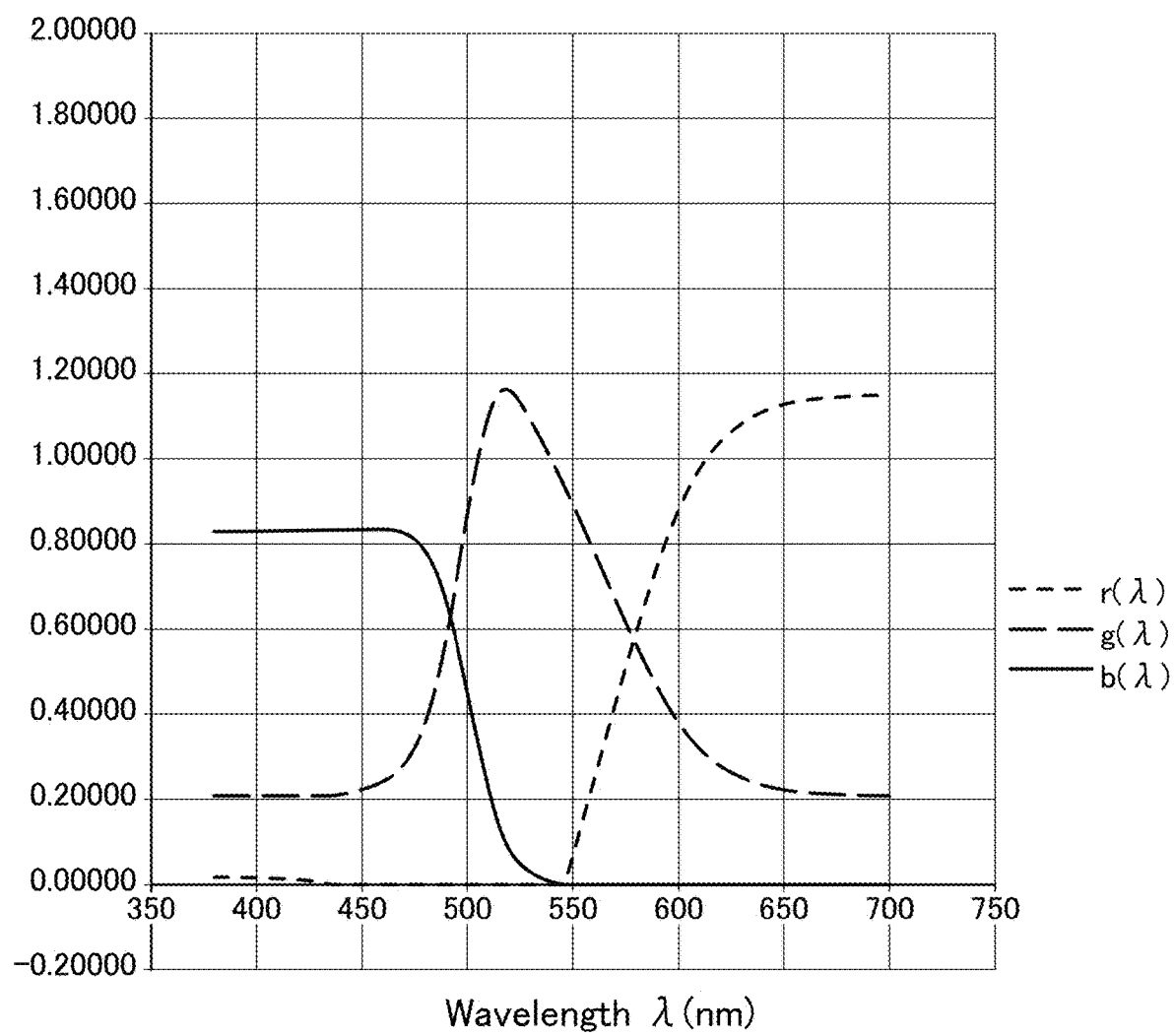
FIG. 12 is a graph representing spectral chromaticity coordinates in the RGB color system to be used in the head-mounted video presentation device according to the fifth embodiment.

Based on the flowchart depicted in FIG. 11, the wavelength conversion step 402 in the fifth embodiment will be described. Steps 1101 to 1104 are the same as the steps 901 to 904 in the fourth embodiment. Then, in step 1105, r[i] and g[i] are subjected to given calculation to perform wavelength conversion. In the fifth embodiment, as calculation for r[i], r[i] is multiplied by an r signal conversion efficiency such that a maximum valve of converted r[i] becomes equal to or less than a maximum value of the r signal in a user recognizable wavelength band. Here, the r signal conversion coefficient is determined such that a maximum one of values obtained when multiplying values of the r signal in the spectral chromaticity coordinates in the RGB color system by the r signal conversion coefficient does not exceed an upper limit of the r signal. Further, as calculation for g[i], g[i] is subjected to the calculation such that a minimum valve of converted g[i] becomes equal to or greater than a minimum value of the g signal in the user recognizable wavelength band. In the fifth embodiment, r[i] and g[i] are converted based on the following formulas.

$$r[i] = \frac{\text{upper\_limit\_r}}{\text{peak\_r}} \times r[i] \quad (8)$$

$$g[i] = \frac{\text{peak\_g} - \text{lower\_limit\_g}}{\text{peak\_g}} \times r[i] + \text{lower\_limit\_g} \quad (9)$$

In the formula (8), upper_limit_r denotes an upper limit of the r signal after the wavelength conversion, and peak_r denotes a maximum value of the r signal before the wavelength conversion. A value obtained by dividing the upper_limit_r by the peak_r is defined as the r signal conversion efficient. As is evident from the formula (8), a maximum value of r[i] after the conversion is the upper limit of the r signal. The upper limit of the r signal is preferably a maximum one of values of the r signal for wavelengths in the user recognizable wavelength band. However, it may be equal to or less than the maximum value of the r signal. In the fifth embodiment, the upper limit of the r signal is 1.14888 which is a value of the r signal at a wavelength of 600 nm. The peak_r is 1.49990 which is a value of the r signal at a wavelength of 700 nm, and the r signal conversion efficient is about 0.766 (1.14888/1.49990). In this case, a maximum one of values obtained when multiplying values of the r signal in the spectral chromaticity coordinates in the RGB color system by the above r signal conversion coefficient is the upper limit of the r signal (1.14888). In the same manner, r[i] in each pixel can be linearly converted into a value whose upper limit is the upper limit of the r signal, by multiplying it by the r signal conversion coefficient indicated in the formula (8).

In view of FIG. 8A, it is understood that a user who can recognize only wavelengths in a wavelength band of 450 to 600 nm is unable to recognize red when an output value of the r signal is greater than a value of the r signal for a wavelength of 600 nm. Therefore, in the fifth embodiment, the value of the r signal for a wavelength of 600 nm is assigned as the upper_limit_r (upper limit of the r signal) so as to allow the value of the r signal for a wavelength of 600 nm to become the maximum value of the r signal after the conversion, and the value of the r signal for a wavelength of 700 nm at which the r signal exhibits a maximum value before the conversion is assigned as the peak_r (pre-conversion maximum value of of the r signal). The upper_limit_r and the peak_r can be determined from the spectral chromaticity coordinates in the RGB color system shown in Table 3 and FIG. 8A, and the r signal conversion coefficient is a preliminarily determinable coefficient.

In the formula (9), peak_g denotes a maximum value of the g signal before the wavelength conversion, and lower_limit_g denotes a lower limit of the g signal after the wavelength conversion, and serves as an offset value. In the fifth embodiment, the peak_g is set to a value (1.16241) of the g signal at a wavelength of 518 nm, and the lower_limit_g is set to a value (0.20837) of the g signal at a wavelength of 600 nm. The coefficient multiplying r[i] in the right term of the formula (9) is a g signal conversion coefficient which is determined such that a value of the g signal after the conversion does not exceed a maximum value of the g signal before the conversion, and the shape of a graph of spectral chromaticity coordinates of the g signal after the conversion becomes similar to the shape of the graph after the conversion. By performing the calculation as shown in the formula (9), it becomes possible to linearly convert g[i] in each pixel by using the lower_limit_g (lower limit of the g value) as a lower limit offset value, and maintaining an upper limit at the same value as that before the conversion. As is evident from FIG. 8A, the g signal is represented by a graph having an upwardly convex shape, wherein, computing values of the g signal for wavelength at both edges in a wavelength band of 450 to 600 nm which is recognizable by a user, the value of the g signal for 600 nm is greater than the other. Thus, it is understood that this user can recognize green as long as an output value of the r signal is equal to or greater than the value of the r signal for a wavelength of 600 nm. Therefore, in the fifth embodiment, the calculation is performed such that the value of the g signal for a wavelength of 600 nm is assigned as the lower_limit_g (lower limit of the g signal) used as an offset signal, so as to allow the value of the g signal for a wavelength of 600 nm to become the minimum value of the g signal after the wavelength conversion, and the peak_g, i.e. the value of the g signal for a wavelength of 518 nm at which the g signal exhibits a maximum value before the wavelength conversion, is maintained.

In step 1106, r[i] and g[i] converted, respectively, by the formulas (8) and (9) are multiplied by the stimulus sum S[i] to acquired wavelength-converted values of the R and G signals, and, in step 1107, an RGB signal including these values is presented to the video presentation unit 102. With regard to the B signal, a value output from the imaging unit 101 is directly used without being subjected to the conversion. The calculation for wavelength conversion regarding r[i] is only multiplication. Thus, the stimulus sum S[i] used for division in the step 1104 is canceled out by multiplication of the stimulus sum S[i] in the strep 1106. Therefore, the division and multiplication of the stimulus sum S[i] in the steps 1104 and 1106 may be omitted, and R[i] may be directly subjected to the wavelength conversion.

A calculation method for the wavelength conversion is not limited to using the above formulas (8) and (9). The calculation for r[i] may be any suitable calculation as long as the maximum value of r[i] after the conversion does not exceed the upper limit of the r signal which is equal to or less than a maximum one of values of r signals in the user recognizable wavelength band. For example, as long as a converted value of the r signal does not exceed the upper limit of the r signal, the r signal conversion coefficient may be set to ⅔, and r[i] may be simply multiplied by ⅔. The calculation for g[i] may be any suitable calculation as long as the minimum value of g[i] after the conversion is equal to or less than the lower_limit_g (lower limit of the g signal). For example, the g signal conversion coefficient may be set to 1, and the lower_limit_g may be simply added to g[i]. Alternatively, after dividing g[i] by the peak_g (g signal conversion coefficient=1/peak_g), the lower_limit_g may be added to the resulting quotient. Further, the wavelength conversion may be achieved by processing of only a value of the R signal, or processing of only a value of the G signal.

Through the use of the processing in the fifth embodiment, it becomes possible to perform conversion into an RGB signal for expressing a user recognizable wavelength band, while allowing the shape of a graph of spectral chromaticity coordinates to be maintained in a similar shape. Thus, as compared with an embodiment in which a value of the r signal greater than the upper limit thereof and a value of the g signal less than the lower limit thereof are fixed, respectively, to the upper limit and the lower limit, it becomes possible to allow the user to recognize expression such as a color relationship between adjacent areas, in a form close to actual color expression. Further, the wavelength conversion can be executed without involving the XYZ conversion, as with the third and fourth embodiments, so that it is possible to realize high-speed processing.

Sixth Embodiment

A sixth embodiment of the present invention is different from the first to fifth embodiments, in that a head-mounted video presentation device according to the sixth embodiment is a three-dimensional (3D) head-mounted video presentation device configured to present multi-view videos taken by the imaging unit 102 and having disparity, respectively, to eyes of a user. The remaining configuration is the same as that in the first to fifth embodiments. The following description will be made with a focus on the configuration different from that in the first to fifth embodiments.

In the step 401 depicted in FIG. 4, the imaging unit 101 is operable to take a video in a viewing direction of the user to be presented to the left eye of the user, and a video in the viewing direction of the user to be presented to the right eye of the user, and then output first video information including video information having disparity to be presented to the right and left eyes. The videos to be presented, respectively, to the right and left eyes, are different videos having disparity. For example, as a means to acquire the video information to be presented to the right and left eyes, it is possible to use two monocular cameras disposed side-by-side, or a stereo camera. Alternatively, information about right and left videos may be produced using disparity calculated in a single monocular camera.

In the step 402, the wavelength conversion unit 103 is operable to subject each of two pieces of video information to be presented to the right and left eyes, included in the first video information, to wavelength conversion, and output second video information including converted video information having disparity to be presented to the right and left eyes. The wavelength conversion is any one of the wavelength conversions mentioned in the first to fifth embodiments. In the step 403, the video presentation unit 102 is operable to present a video to the left eye of the user, based on one of the pieces of video information to be presented to the left eye, included in the second video information, and present a video to the right eye of the user, based on the other piece of video information to be presented to the right eye, included in the second video information. For example, as a means to present the two pieces of video information to be presented to the right and left eyes, it is possible to use two displays. FIG. 1B depicts one configuration in which two projector lenses are used as the video presentation unit 102. In the sixth embodiment, the two pieces of video information having disparity are presented, respectively, to the right and left eyes, via the two lenses. Through the use of the configuration in the sixth embodiment, it becomes possible to provide a three dimensional video to the user. Further, in a case where the eyes of the user have different sensitivities to each wavelength, it is desirable to perform different wavelength conversions suited to the respective eyes, and present videos subjected to the different wavelength conversions suited to the respective eyes. Alternatively, for example, two pieces of video information for the two eyes may be subjected to wavelength conversion designed for sensitivity of one of the eyes.

Seventh Embodiment

The present invention is intended to subject light in a wavelength band to which a user has relatively low sensitivity, to wavelength conversion, to allow the user to recognize a video in a wavelength band to which the user has relatively high sensitivity. A head-mounted video presentation device according to a seventh embodiment of the present invention is configured to allow a user to recognize light in a specific wavelength band to which the user has particularly good sensitivity within a wavelength band to which the user has relatively high sensitivity. Preferably, the head-mounted video presentation device is configured to allow the user to recognize light in a narrower wavelength band to which the user has highest sensitivity. The remaining configuration is the same as that in the first to sixth embodiments. The following description will be made with a focus on the configuration different from that in the first to sixth embodiments.

In a situation where, when a video is presented from the video presentation unit 102 of the head-mounted video presentation device 100 according to the present invention, the intensity of light radiated from the video presentation unit is high, power consumption of the device becomes large and thus it can significantly reduce the battery life if it is battery-powered. This is considered to exert a negative influence on operating time. Particularly, when a user has significantly low sensitivity, it is necessary to use a projector or the like as the video presentation unit 102, so as to enter light having higher intensity directly into the eyes of the user. In this situation, power consumption of the device is likely to become larger.

Through the use of the configuration in the seventh embodiment, by converting light to a wavelength band to which the user has particularly high sensitivity, it becomes possible to allow the user to recognize a video using light having lower intensity, and limit a wavelength band of light to be radiated to a narrower range to keep down light energy to be radiated from the video presentation unit, as a whole, thereby reducing power consumption of the head-mounted video presentation device. Further, it becomes possible to reduce a burden on the human body.

Figure 13A:
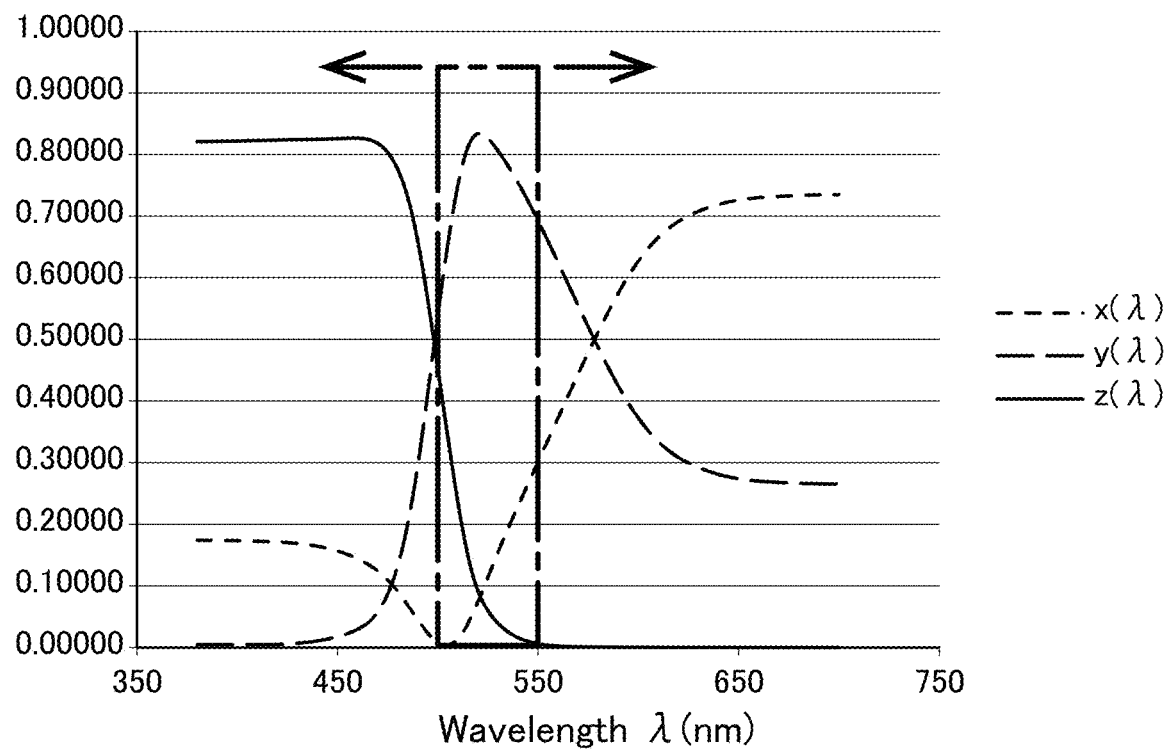
FIG. 13A is a graph representing spectral chromaticity coordinates in the XYZ color system to be used in a head-mounted video presentation device according to a seventh embodiment of the present invention.
Figure 13B:
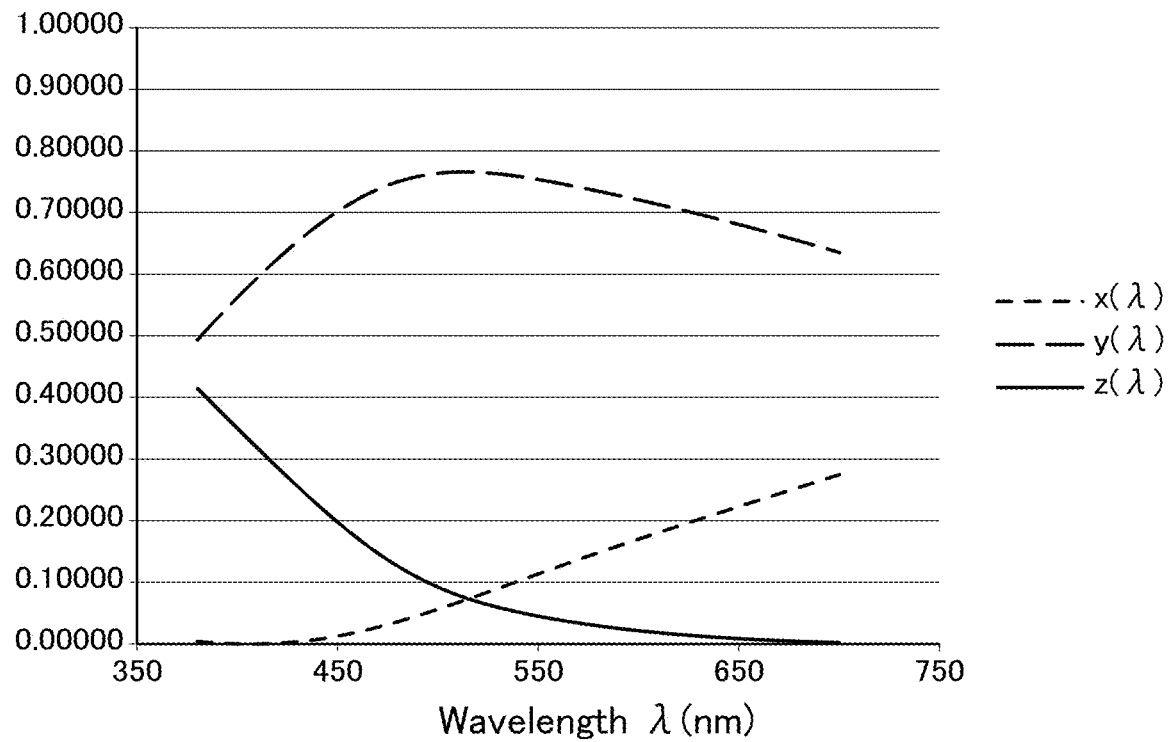
FIG. 13B is a graph representing spectral chromaticity coordinates in the XYZ color system to be used in the head-mounted video presentation device according to the seventh embodiment.

As one example of the seventh embodiment, FIG. 13 depicts one example of graphs of spectral chromaticity coordinates in the XYZ color system, before and after wavelength conversion, in a situation where a user is determined to have certain sensitivity to wavelengths in a wavelength band of 450 to 600 nm, and have particularly good sensitivity to wavelengths in a wavelength band of 500 to 550 nm. Specifically, FIG. 13A is a graph of spectral chromaticity coordinates in the XYZ color system, before the wavelength conversion, and FIG. 13B is a graph of spectral chromaticity coordinates in the XYZ color system, after the wavelength conversion.

As depicted in FIG. 13A, the wavelength band to which the user has particularly high sensitivity is set as a wavelength band 1301 to be converted. Among various heretofore-known measurement methods for user's sensitivity, any method may be used as long as it is capable of measuring user's sensitivity. As a wavelength bandwidth becomes narrower, light energy to be radiated from the video presentation unit can be more largely reduced, but color reproducibility is more largely deteriorated. Therefore, the wavelength bandwidth is appropriately determined in a trade-off relationship with color reproducibility, the influence on the human body due to high light intensity, and the like. The wavelength bandwidth may be set to 0 so as to minimize the radiation light energy. In this case, it is possible to allow a user to recognize a video at low energy based on only a change in brightness of a single color such as a gray scale, thereby reducing power consumption.

Here, a wavelength band of less than 500 nm and a wavelength band of greater than 550 nm are defined as a wavelength band to which the user has degraded sensitivity, and, as a wavelength band to which the used has particularly good sensitivity, FIG. 13B depicts a graph of spectral chromaticity coordinates in the XYZ color system, which is derived as the second wavelength band by the same method as that in the second embodiment. Then, the wavelength conversion is performed by the same technique as that in the second embodiment. As a result, it becomes possible to allow the user to observe even visible light in a wavelength band to which the user has degraded sensitivity, as visible light in a wavelength band of 500 to 550 nm to which the user has particularly high sensitivity. It is apparent to a person of ordinary skill in the art that the above conversion can be implemented using the technique of any embodiment other than the second embodiment.

In the aforementioned processes or operations, the order or the combination thereof may be freely changed as long as it does not cause any inconsistency. Further, although the present invention is illustrated and described herein with reference to the above specific embodiments, it is to be understood that the present invention is not limited to such embodiments. Rather, various modifications and changes may be made therein without departing from the spirit and scope of the present invention as set forth in appended claims. Further, the effects described in the above embodiments are no more than most advantageous effects obtainable from the present invention. Thus, advantageous effects of the present invention are not limited to the effects described in the above embodiments.

LIST OF REFERENCE SIGNS

100: head-mounted video presentation device
101: imaging unit
102: video presentation unit
103: wavelength conversion unit
104: processing unit
105: storage unit
106: program
107: internal storage part
108: bus
110: projector housing
111: prism
112: prism

The invention claimed is:

1. A head-mounted video presentation device for a user having degraded sensitivity to a first wavelength band as a part of a visible light wavelength band as compared with a second wavelength band as the remaining part of the visible light wavelength band, comprising:
 an imaging unit for taking a video in a viewing direction of the user to acquire first video information;
 a wavelength conversion unit for wavelength converting at least a part of a color signal for at least the first wavelength band in the first video information based on a wavelength output by the at least the part of the color signal, into a color signal outputting a wavelength in the second wavelength band, and outputting second video information based on the wavelength converted color signal; and
 a video presentation unit for presenting, based on the second video information, a wavelength-converted video in the viewing direction of the user, to the user.

2. The head-mounted video presentation device as recited in claim 1, wherein the wavelength conversion unit has:
 a first table including spectral chromaticity coordinates in an XYZ color system; and
 a second table for converting wavelengths in the first wavelength band into wavelengths in the second wavelength band, wherein a part of plural sets of chromaticity coordinates each associated in the first table with a respective one of the wavelengths in the first wavelength band are associated, respectively, with a part of the wavelengths in the second wavelength band, and at least a part of the remaining sets of chromaticity coordinates each associated in the first table with a respective one of the wavelengths in the second wavelength band are associated, respectively, with plural sets of chromaticity coordinates different from the sets of chromaticity coordinates each associated in the first table with a respective one of the wavelengths in the second wavelength band, and wherein the wavelength conversion unit is operable to:
 acquire, based on the first video information, an XYZ signal expressing colors by the XYZ color system;
 identify, based on the first table, a wavelength corresponding to the XYZ signal;
 acquire, based on the second table, an XYZ signal for a post-conversion wavelength associated with the identified wavelength; and
 output second video information based on the XYZ signal for the post-conversion wavelength.

3. The head-mounted video presentation device as recited in claim 1, wherein the wavelength conversion unit is operable to:
 acquire, based on the first video information, an RGB signal expressing colors by an RGB color system;
 calculate a stimulus sum of an XYZ signal, based on the RGB signal;
 divide a value of an R signal acquired from the RGB signal by the stimulus sum to acquire a value of an r signal;
 when the acquired value of the r signal is greater than an upper limit of the r signal, convert the acquired value of the r signal into the upper limit of the r signal;
 multiply the converted value of the r signal by the stimulus sum to acquire a converted value of the R signal; and
 output second video information based on an RGB signal including the converted value of the R signal,
 wherein the upper limit of the r signal is equal to or less than a maximum value of the r signal in the second wavelength band to be obtained by subjecting the spectral chromaticity coordinates in the XYZ color system to RGB conversion.

4. The head-mounted video presentation device as recited in claim 3, wherein the wavelength conversion unit is operable to:
 divide a value of a G signal acquired from the RGB signal by the stimulus sum to acquire a value of a g signal;
 when the acquired value of the g signal is less than a lower limit of the g signal, convert the acquired value of the g signal into the lower limit of the g signal;

multiply the converted value of the g signal by the stimulus sum to acquire a converted value of the G signal; and output second video information based on an RGB signal further including the converted value of the G signal, wherein the lower limit of the g signal is equal to or greater than a greater one of values of the g signal for wavelengths at both edges of the second wavelength band to be obtained by subjecting the spectral chromaticity coordinates in the XYZ color system to RGB conversion.

5. The head-mounted video presentation device as recited in claim 1, wherein the wavelength conversion unit is operable to:

acquire, based on the first video information, an RGB signal expressing colors by an RGB color system;

multiply a value of an R signal included in the acquired RGB signal by an r signal conversion coefficient determined based on spectral chromaticity coordinates in an RGB color system to be obtained by subjecting the spectral chromaticity coordinates in the XYZ color system to RGB conversion, to acquire a converted value of the R signal;

output second video information based on an RGB signal including the converted value of the R signal, wherein the r signal conversion coefficient is determined such that a maximum one of values obtained when multiplying values of an r signal in the spectral chromaticity coordinates in the RGB color system by the r signal conversion coefficient does not exceed an upper limit of the r signal, and wherein the upper limit of the r signal is equal to or less than a maximum value of the r signal in the second wavelength band in the spectral chromaticity coordinates in the RGB color system.

6. The head-mounted video presentation device as recited in claim 5, wherein the wavelength conversion unit is operable to, instead of multiplying a value of the R signal included in the acquired RGB signal by the r signal conversion coefficient to acquire a converted value of the R signal, to: divide a value of an R signal included in the acquired RGB signal by a stimulus sum calculated based on the acquired RGB signal, to obtain a value of an r signal; multiply the obtained value of the r signal by the r signal conversion coefficient to acquire a converted value of the r signal; and multiply the converted value of the r signal by the stimulus sum, to acquire a converted value of the R signal.

7. The head-mounted video presentation device as recited in claim 5, wherein the wavelength conversion unit is operable to:

calculate a stimulus sum of an XYZ signal, based on the acquired RGB signal;

divide a value of a G signal included in the acquired RGB signal by the stimulus sum to acquire a value of a g signal;

after multiplying the acquired value of the g signal by a given coefficient, add a lower limit of the g signal to the resulting product, and multiply the resulting sum by the stimulus sum to acquire a converted value of the G signal; and output second video information based on an RGB signal further including the converted value of the G signal, wherein the lower limit of the g signal is equal to or greater than a greater one of values of the g signal for wavelengths at both edges of the second wavelength band in the spectral chromaticity coordinates in the RGB color system.

8. The head-mounted video presentation device as recited in claim 3, wherein the upper limit of the r signal is a value of the r signal for a wavelength of 600 nm.

9. The head-mounted video presentation device as recited in claim 1, wherein the second wavelength band is in the range of 450 to 600 nm.

10. The head-mounted video presentation device as recited in claim 1, wherein the video presentation unit is a projector.

11. The head-mounted video presentation device as recited in claim 1, wherein the video presentation unit is a display.

12. The head-mounted video presentation device as recited in claim 1, wherein the imaging unit is operable to take a left eye video in the viewing direction of the user to be presented to a left eye of the user, and a right eye video in the viewing direction of the user to be presented to a right eye of the user, the right eye video being different from the left eye video, and wherein the first video information includes video information for the left eye video and the right eye video, and the second video information includes video information for a converted left eye video and a converted right eye video obtained by converting the left eye video and the right eye video through the wavelength conversion unit, and wherein the video presentation unit is operable, based on the video information for the converted left eye video included in the second video information, to present the converted left eye video to the left eye of the user, and, based on the video information for the converted right eye video included in the second video information, to present the converted right eye video to the right eye of the user.

13. The head-mounted video presentation device as recited in claim 1, wherein the user is a patient with a retinal degenerative disease, whose eyeball is administrated with a protein for enabling ganglion cells to become receptive to light in the second wavelength band.

14. A wavelength conversion unit for outputting, to a user having degraded sensitivity to a first wavelength band as a part of a visible light wavelength band as compared with a second wavelength band as the remaining part of the visible light wavelength band, a video signal for presenting a video based on a color signal expressing colors in the second wavelength band, the wavelength conversion unit being operable to wavelength convert at least a part of a color signal for at least the first wavelength band in first video information acquired by taking a video in a viewing direction of the user based on a wavelength output by the at least the part of the color signal, into the color signal outputting a wavelength in the second wavelength band, and outputting second video information based on the wavelength converted color signal.

15. A wavelength conversion unit for outputting of claim 14, wherein the wavelength conversion unit includes one of a first to a third wavelength conversion units, and wherein the first wavelength conversion unit has:

a first table including spectral chromaticity coordinates in an XYZ color system; and a second table for converting wavelengths in the first wavelength band into wavelengths in the second wavelength band, wherein a part of plural sets of chromaticity coordinates each associated in the first table with a respective one of the wavelengths in the first wavelength band are associated, respectively, with a part of the wavelengths in the second wavelength band, and at least a part of the remaining sets of chromaticity coordinates each associated in the first table with a respective one of the wavelengths in the second wavelength band are associated, respectively, with plural sets of chromaticity coordinates different from the sets of chromaticity coordinates each associated in the first table with a respective one of the wavelengths in the second wavelength band, and wherein the first wavelength conversion unit is operable to:
acquire, based on the first video information, an XYZ signal expressing colors by the XYZ color system;
identify, based on the first table, a wavelength corresponding to the XYZ signal;
acquire, based on the second table, an XYZ signal for a post-conversion wavelength associated with the identified wavelength; and
output second video information based on the XYZ signal for the post-conversion wavelength,
wherein the second wavelength conversion unit is to operable to:
acquire, based on the first video information, an RGB signal expressing colors by an RGB color system;
calculate a stimulus sum of an XYZ signal, based on the RGB signal;
divide a value of an R signal acquired from the RGB signal by the stimulus sum to acquire a value of an r signal;
when the acquired value of the r signal is greater than an upper limit of the r signal, convert the acquired value of the r signal into the upper limit of the r signal;
multiply the converted value of the r signal by the stimulus sum to acquire a converted value of the R signal; and
output second video information based on an RGB signal including the converted value of the R signal,
wherein the upper limit of the r signal is equal to or less than a maximum value of the r signal in the second wavelength band to be obtained by subjecting the spectral chromaticity coordinates in the XYZ color system to RGB conversion, and
wherein the third wavelength conversion unit is operable to:
acquire, based on the first video information, an RGB signal expressing colors by an RGB color system;
multiply a value of an R signal included in the acquired RGB signal by an r signal conversion coefficient determined based on spectral chromaticity coordinates in an RGB color system to be obtained by subjecting the spectral chromaticity coordinates in the XYZ color system to RGB conversion, to acquire a converted value of the R signal;
output second video information based on an RGB signal including the converted value of the R signal,
wherein the r signal conversion coefficient is determined such that a maximum one of values obtained when multiplying values of an r signal in the spectral chromaticity coordinates in the RGB color system by the r signal conversion coefficient does not exceed an upper limit of the r signal, and wherein the upper limit of the r signal is equal to or less than a maximum value of the r signal in the second wavelength band in the spectral chromaticity coordinates in the RGB color system.

16. A method for outputting, to a user having degraded sensitivity to a first wavelength band as a part of a visible light wavelength band as compared with a second wavelength band as the remaining part of the visible light wavelength band, a video signal for presenting a video based on a color signal expressing colors in the second wavelength band, the method comprising causing a computer to execute the steps of: wavelength converting at least a part of a color signal for at least the first wavelength band in first video information acquired by taking a video in a viewing direction of the user based on a wavelength output by the at least the part of the color signal, into the color signal outputting a wavelength in the second wavelength band; and outputting second video information based on the wavelength converted color signal.

17. A method of claim 16, wherein the steps comprises one of a first to a wavelength conversion steps, and
wherein, for the first wavelength conversion step, the computer has:
a first table including spectral chromaticity coordinates in an XYZ color system; and
a second table for converting wavelengths in the first wavelength band into wavelengths in the second wavelength band, wherein a part of plural sets of chromaticity coordinates each associated in the first table with a respective one of the wavelengths in the first wavelength band are associated, respectively, with a part of the wavelengths in the second wavelength band, and at least a part of the remaining sets of chromaticity coordinates each associated in the first table with a respective one of the wavelengths in the second wavelength band are associated, respectively, with plural sets of chromaticity coordinates different from the sets of chromaticity coordinates each associated in the first table with a respective one of the wavelengths in the second wavelength band, and wherein the first wavelength conversion step comprises the steps of:
acquiring, based on the first video information, an XYZ signal expressing colors by the XYZ color system;
identifying, based on the first table, a wavelength corresponding to the XYZ signal;
acquiring, based on the second table, an XYZ signal for a post-conversion wavelength associated with the identified wavelength; and
outputting second video information based on the XYZ signal for the post-conversion wavelength,
wherein the second wavelength conversion step comprises the steps of:
acquiring, based on the first video information, an RGB signal expressing colors by an RGB color system;
calculating a stimulus sum of an XYZ signal, based on the RGB signal;
dividing a value of an R signal acquired from the RGB signal by the stimulus sum to acquire a value of an r signal;
when the acquired value of the r signal is greater than an upper limit of the r signal, converting the acquired value of the r signal into the upper limit of the r signal;
multiplying the converted value of the r signal by the stimulus sum to acquire a converted value of the R signal; and
outputtting second video information based on an RGB signal including the converted value of the R signal,
wherein the upper limit of the r signal is equal to or less than a maximum value of the r signal in the second wavelength band to be obtained by subjecting the spectral chromaticity coordinates in the XYZ color system to RGB conversion, and
wherein the third wavelength conversion step comprises the steps of:
acquiring, based on the first video information, an RGB signal expressing colors by an RGB color system;
multiplying a value of an R signal included in the acquired RGB signal by an r signal conversion coefficient determined based on spectral chromaticity coordinates in an RGB color system to be obtained by subjecting the spectral chromaticity coordinates in the XYZ color system to RGB conversion, to acquire a converted value of the R signal;

outputting second video information based on an RGB signal including the converted value of the R signal, wherein the r signal conversion coefficient is determined such that a maximum one of values obtained when multiplying values of an r signal in the spectral chromaticity coordinates in the RGB color system by the r signal conversion coefficient does not exceed an upper limit of the r signal, and wherein the upper limit of the r signal is equal to or less than a maximum value of the r signal in the second wavelength band in the spectral chromaticity coordinates in the RGB color system.

18. A non-transitory computer-readable medium with instructions stored thereon, that when executed by a processor, perform the steps of the method of claim 16.

* * * * *